(12) United States Patent
Taylor et al.

(10) Patent No.: US 10,605,099 B2
(45) Date of Patent: Mar. 31, 2020

(54) COOLING ARRANGEMENTS IN TURBINE BLADES

(71) Applicant: General Electric Company, Schenectady, NY (US)

(72) Inventors: Zachary James Taylor, Greenville, SC (US); Lucas Seth Wedmore, Greenville, SC (US); Hiteshkumar Rameshchandra Mistry, Bangalore (IN)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 15/745,165

(22) PCT Filed: Jul. 31, 2015

(86) PCT No.: PCT/US2015/043193
§ 371 (c)(1),
(2) Date: Jan. 16, 2018

(87) PCT Pub. No.: WO2017/023258
PCT Pub. Date: Feb. 9, 2017

(65) Prior Publication Data
US 2018/0209278 A1    Jul. 26, 2018

(51) Int. Cl.
*F01D 5/18* (2006.01)
*F01D 11/08* (2006.01)
*F01D 5/22* (2006.01)

(52) U.S. Cl.
CPC ............. *F01D 5/187* (2013.01); *F01D 5/225* (2013.01); *F01D 11/08* (2013.01);
(Continued)

(58) Field of Classification Search
CPC .......... F01D 5/187; F01D 5/225; F01D 11/08; F05D 2220/32; F05D 2240/307;
(Continued)

(56) References Cited

U.S. PATENT DOCUMENTS 4,948,338 A * 8/1990 Wickerson ............... F01D 5/187
                                                      416/189
5,350,277 A * 9/1994 Jacala ...................... F01D 5/185
                                                      416/90 R
(Continued)

FOREIGN PATENT DOCUMENTS

EP    1 041 247 A2    10/2000
GB    2 298 246 A      8/1996
(Continued)

OTHER PUBLICATIONS

International Search Report and Written Opinion issued in connection with corresponding PCT Application No. PCT/US2015/043193 dated Apr. 11, 2016.
(Continued)

*Primary Examiner* — Igor Kershteyn
(74) *Attorney, Agent, or Firm* — Charlotte C. Wilson; James W. Pemrick

(57) ABSTRACT

A rotor blade (16) for a turbine of a gas turbine that includes an airfoil (25). The airfoil may have a leading edge, a trailing edge, an outboard tip, and an inboard end where the airfoil attaches to a root configured to couple the turbine blade to a rotor disc. The airfoil (25) may include a tip shroud (55) at an outboard tip. The rotor blade may have a cooling configuration that includes: elongated cooling channels (33) for receiving and directing a coolant through the airfoil (25); and branching passages (75) formed through the tip shroud (55), each of which elongates between a connection with one of the cooling channels (33) and an outlet port (37) formed on a surface of the tip shroud (55). The branching passages
(Continued)

(75) may have a canted orientation relative the outboard surface of the tip shroud (55).

19 Claims, 18 Drawing Sheets

(52) U.S. Cl.
CPC .... *F05D 2220/32* (2013.01); *F05D 2240/307* (2013.01); *F05D 2260/202* (2013.01); *Y02T 50/671* (2013.01); *Y02T 50/673* (2013.01); *Y02T 50/676* (2013.01)

(58) Field of Classification Search
CPC ............. F05D 2260/202; Y02T 50/671; Y02T 50/673; Y02T 50/676
See application file for complete search history.

(56) References Cited

U.S. PATENT DOCUMENTS

| | | | | |
|---|---|---|---|---|
| 5,460,486 | A * | 10/1995 | Evans | F01D 5/187 415/115 |
| 5,482,435 | A * | 1/1996 | Dorris | F01D 5/08 416/97 R |
| 5,785,496 | A * | 7/1998 | Tomita | F01D 5/187 416/191 |
| 6,499,950 | B2 | 12/2002 | Willett et al. | |
| 6,761,534 | B1 * | 7/2004 | Willett | F01D 5/18 416/191 |
| 7,334,993 | B2 | 2/2008 | Sekihara et al. | |
| 8,322,986 | B2 * | 12/2012 | DeSander | F01D 5/187 416/96 R |
| 2001/0048878 | A1 * | 12/2001 | Willett | F01D 5/182 416/97 R |

FOREIGN PATENT DOCUMENTS

| | | |
|---|---|---|
| JP | 2010-285878 A | 12/2010 |
| WO | 2017/020178 A1 | 2/2017 |

OTHER PUBLICATIONS

International Preliminary Report on Patentability issued in connection with corresponding PCT Application No. PCT/US2015/043193 dated Feb. 6, 2018.

* cited by examiner

COOLING ARRANGEMENTS IN TURBINE BLADES

BACKGROUND OF THE INVENTION

This present application relates to interior cooling channels and configurations of the blades in gas turbine engines. More specifically, but not by way of limitation, the present application relates to interior cooling channels and configurations formed near the outer radial tip of turbine rotor blades.

It will be appreciated that combustion or gas turbine engines ("gas turbines) include a compressor, combustor, and turbine. The compressor and turbine sections generally include rows of blades that are axially stacked in stages. Each stage includes a row of circumferentially-spaced stator blades, which are fixed, and a row of rotor blades, which rotate about a central turbine axis or shaft. In operation, generally, the compressor rotor blades rotate about the shaft, and, acting in concert with the stator blades, compress a flow of air. The supply of compressed air then is used in the combustor to combust a supply of fuel. The resulting flow of hot expanding gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, the blades within the turbine become highly stressed with extreme mechanical and thermal loads.

The ever-increasing demand for energy makes the engineering of more efficient gas turbines an ongoing and significant objective. While several strategies for increasing the efficiency of gas turbines are known, it remains a challenging objective because such alternatives—which, for example, include increasing the size of the engine, increasing the temperatures through the hot-gas path, and increasing the rotational velocities of the rotor blades—generally place additional strain on parts that are already highly stressed. As a result, improved apparatus, methods and/or systems that reduce operational stresses placed on turbine blades or allow the turbine blades to better withstand these stresses or operate more efficiently are in great demand.

One strategy for alleviating the thermal stress on the blades is through actively cooling them during operation. Such cooling, for example, may allow the blades to withstand higher firing temperatures, withstand greater mechanical stresses at high operating temperatures, and/or extend the part-life of the blades, all of which may allow the gas turbine to be more cost-effective and efficient in its operation. One way to cool blades during operation is through the use of internal cooling passageways, channels, or circuits. Generally, this involves passing a relatively cool supply of compressed air, which may be supplied by the compressor of the gas turbine, through internal cooling channels within the blades. For a number of reasons, as will be appreciated, great care is required in designing and manufacturing the configuration of these interior cooling channels. First, the use of cooling air comes at a price. That is, air that is diverted from the compressor to the turbine section of the engine for cooling bypasses the combustor and, thus, decreases the efficiency of the engine. Second, newer, more aggressively shaped aerodynamic blade configurations are thinner and more curved or twisted, which requires the cooling channels to perform well while having a compact design. Third, to reduce mechanical loads, cooling channels may be formed to remove unnecessary weight from the blade; however, the blades still must remain strong to withstand extreme mechanical loads. Cooling channels, therefore, must be designed such that the turbine blade is lightweight, yet remains robust, while also limiting stress concentrations and/or effectively cooling those areas where such concentrations are unavoidable. Fourth, cooling configurations may be configured such that coolant exiting the blade enhances efficient operation. Specifically, because coolant exiting from cooling channels disrupts flow through the gas path, it causes aerodynamic loses. Further, the manner in which coolant is released may affect the cooling effect it has once released, i.e., on the outer surface of the blade. Thus, cooling configurations that release coolant so that aerodynamic loses are minimized while cooling effectiveness is enhanced are desirable. Accordingly, cooling configurations that satisfy these several competing criteria in ways that promote structural robustness, component longevity, and efficient usage of coolant are in commercially demand.

BRIEF DESCRIPTION OF THE INVENTION

The present application thus describes a rotor blade for a turbine of a gas turbine that includes an airfoil. The airfoil may have a leading edge, a trailing edge, an outboard tip, and an inboard end where the airfoil attaches to a root configured to couple the turbine blade to a rotor disc. The airfoil may include a tip shroud at an outboard tip. The rotor blade may have a cooling configuration that includes: elongated cooling channels for receiving and directing a coolant through the airfoil; and branching passages formed through the tip shroud, each of which elongates between a connection with one of the cooling channels and an outlet port formed on a surface of the tip shroud. The branching passages may have a canted orientation relative the outboard surface of the tip shroud.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
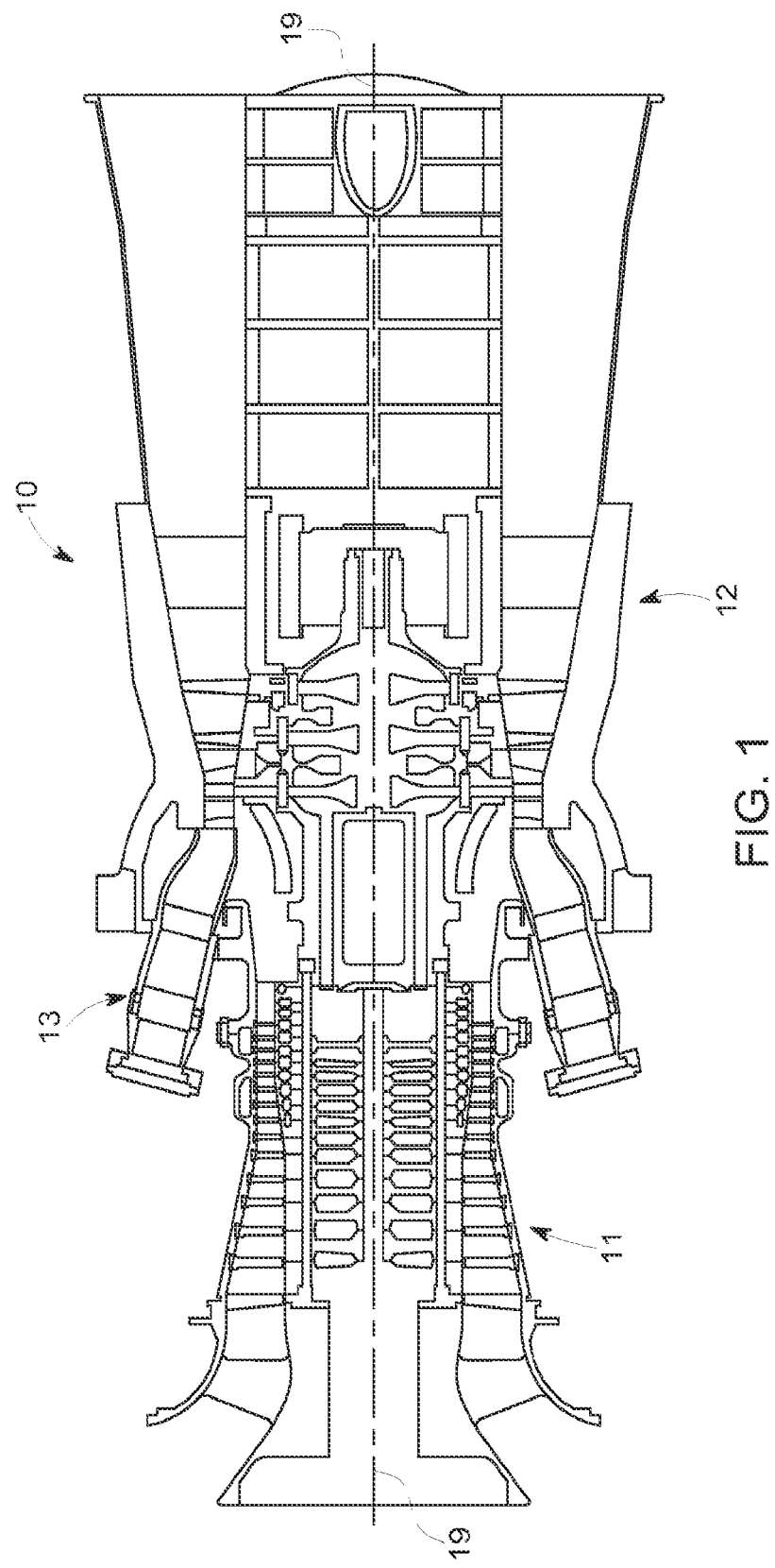
FIG. 1 is a schematic representation of an exemplary gas turbine in which blades according to embodiments of the present application may be used.

Aspects and advantages of the invention are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to a certain type of gas turbine or turbine engine, the technology of the present invention also may be applicable to other types of turbine engines as would the understood by a person of ordinary skill in the relevant technological arts.

Given the nature of gas turbine operation, several descriptive terms may be used throughout this application so to explain the functioning of the engine and/or the several sub-systems or components included therewithin, and it may prove beneficial to define these terms at the onset of this section. Accordingly, these terms and their definitions, unless stated otherwise, are as follows. The terms "forward" and "aft" or "aftward", without further specificity, refer to directions relative to the orientation of the gas turbine. That is, "forward" refers to the forward or compressor end of the engine, and "aft" or "aftward" refers to the aft or turbine end of the engine. It will be appreciated that each of these terms may be used to indicate movement or relative position within the engine. The terms "downstream" and "upstream" are used to indicate position within a specified conduit relative to the general direction of flow moving through it. (It will be appreciated that these terms reference a direction relative to an expected flow during normal operation, which should be plainly apparent to anyone of ordinary skill in the art.) The term "downstream" refers to the direction in which the fluid is flowing through the specified conduit, while "upstream" refers to the direction opposite that. Thus, for example, the primary flow of working fluid through a gas turbine, which begins as air moving through the compressor and then becomes combustion gases within the combustor and beyond, may be described as beginning at an upstream location toward an upstream or forward end of the compressor and terminating at an downstream location toward a downstream or aft end of the turbine. In regard to describing the direction of flow within a common type of combustor, as discussed in more detail below, it will be appreciated that compressor discharge air typically enters the combustor through impingement ports that are concentrated toward the aft end of the combustor (relative to the combustors longitudinal axis and the aforementioned compressor/turbine positioning defining forward/aft distinctions). Once in the combustor, the compressed air is guided by a flow annulus formed about an interior chamber toward the forward end of the combustor, where the air flow enters the interior chamber and, reversing it direction of flow, travels toward the aft end of the combustor. In yet another context, the flow of coolant through cooling channels or passages may be treated in the same manner.

Additionally, the term "rotor blade", without further specificity, is a reference to the rotating blades of either the compressor or the turbine, which include both compressor rotor blades and turbine rotor blades. The term "stator blade", without further specificity, is a reference to the stationary blades of either the compressor or the turbine, which include both compressor stator blades and turbine stator blades. The term "blades" will be used herein to refer to either type of blade. Thus, without further specificity, the term "blades" is inclusive to all type of turbine engine blades, including compressor rotor blades, compressor stator blades, turbine rotor blades, and turbine stator blades.

Finally, given the configuration of compressor and turbine about a central common axis, as well as the cylindrical configuration common to many combustor types, terms describing position relative to an axis may be used herein. In this regard, it will be appreciated that the term "radial" refers to movement or position perpendicular to an axis. Related to this, it may be required to describe relative distance from the central axis. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis. Finally, the term "circumferential" refers to movement or position around an axis. As mentioned, while these terms may be applied in relation to the common central axis that extends through the compressor and turbine sections of the engine, these terms also may be used in relation to other components or sub-systems of the engine.

Figure 2:
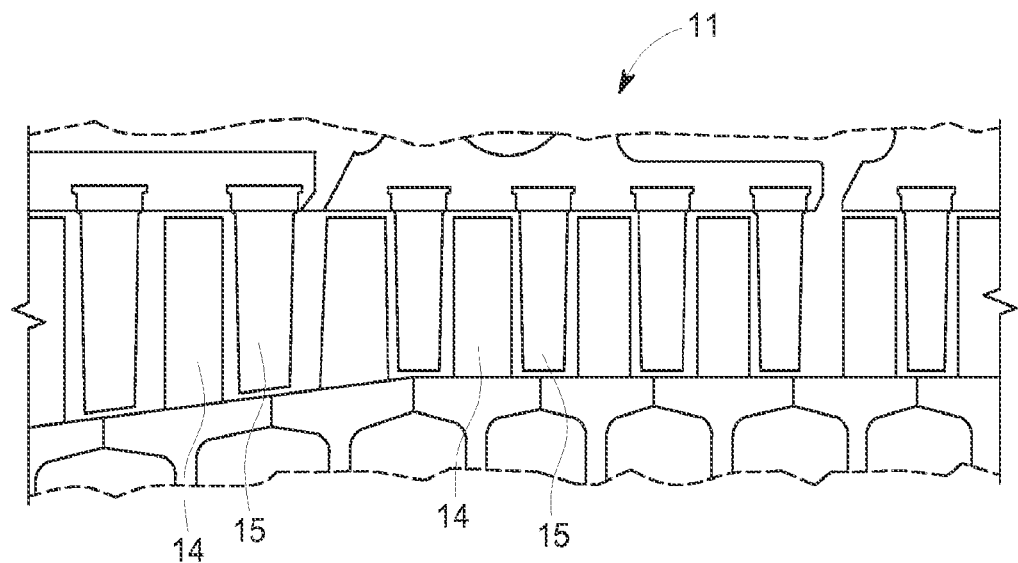
FIG. 2 is a sectional view of the compressor section of the gas turbine of FIG. 1.
Figure 3:
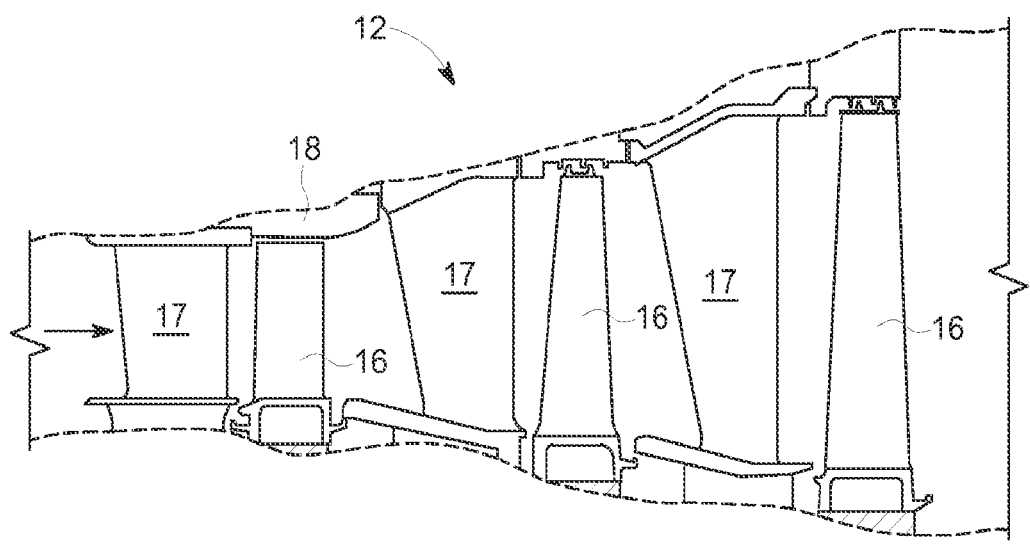
FIG. 3 is a sectional view of the turbine section of the gas turbine of FIG. 1.

By way of background, referring now to the figures, FIGS. 1 through 3 illustrate an exemplary gas turbine in which embodiments of the present application may be used. It will be understood by those skilled in the art that the present invention is not limited to this type of usage. As stated, the present invention may be used in gas turbines, such as the engines used in power generation and airplanes, steam turbine engines, and other types of rotary engines. The examples provided are not meant to be limiting to the type of the turbine engine. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis.

FIG. 2 illustrates a view of an exemplary multi-staged axial compressor 11 that may be used in the gas turbine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 may include a plurality of stages. Three exemplary stages are illustrated, but more or less stages may be present in the turbine 12. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 12 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 12. The direction of flow of the hot gases through the hot gas path is indicated by the arrow. As one of ordinary skill in the art will appreciate, the turbine 12 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within the axial compressor 11 may compress a flow of air. In the combustor 13, energy may be released when the compressed air is mixed with a fuel and ignited. The resulting flow of hot gases from the combustor 13, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 6:
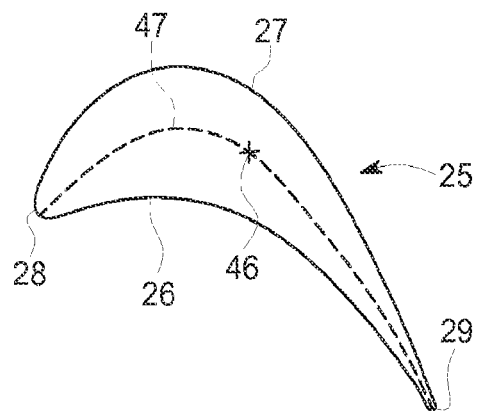
FIG. 6 is a section view along sight line 6-6 of FIG. 4.
Figure 7:
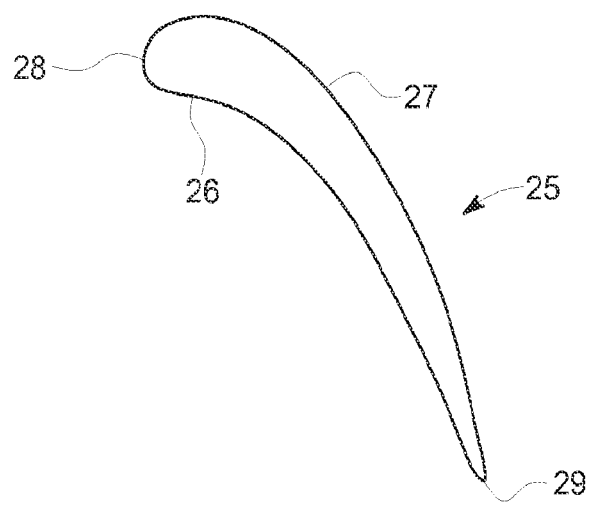
FIG. 7 is a section view along sight line 7-7 of FIG. 4.
Figure 8:
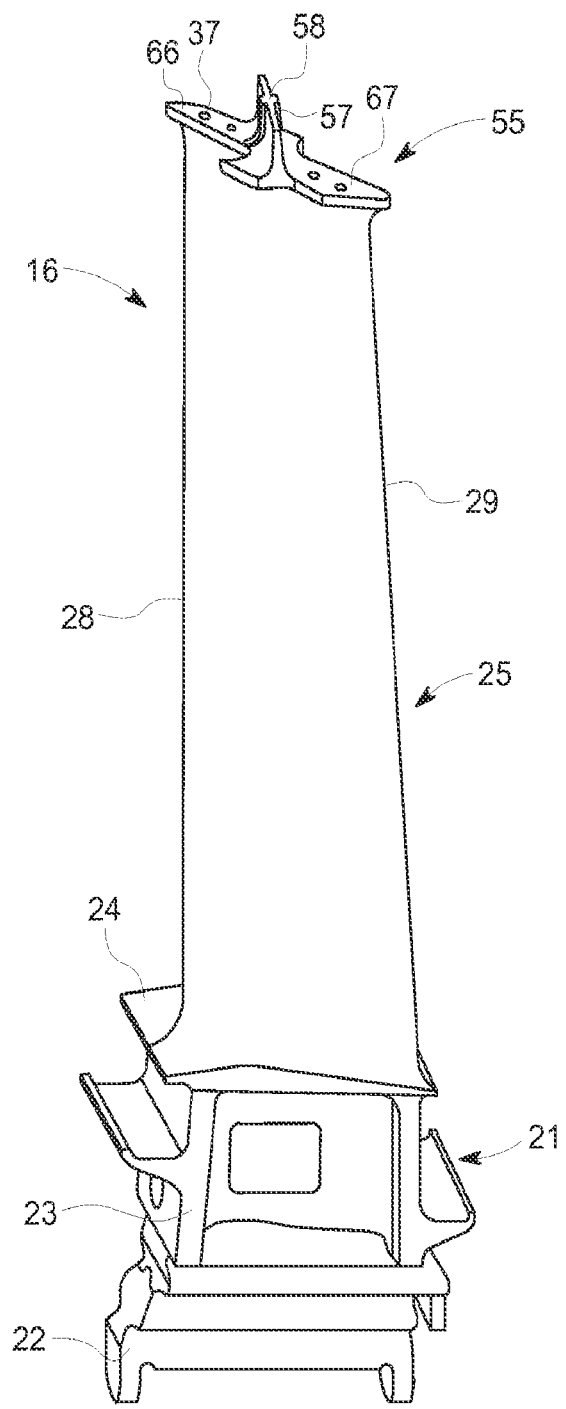
FIG. 8 is a perspective view of an exemplary turbine rotor blade that includes a tip shroud.
Figure 9:
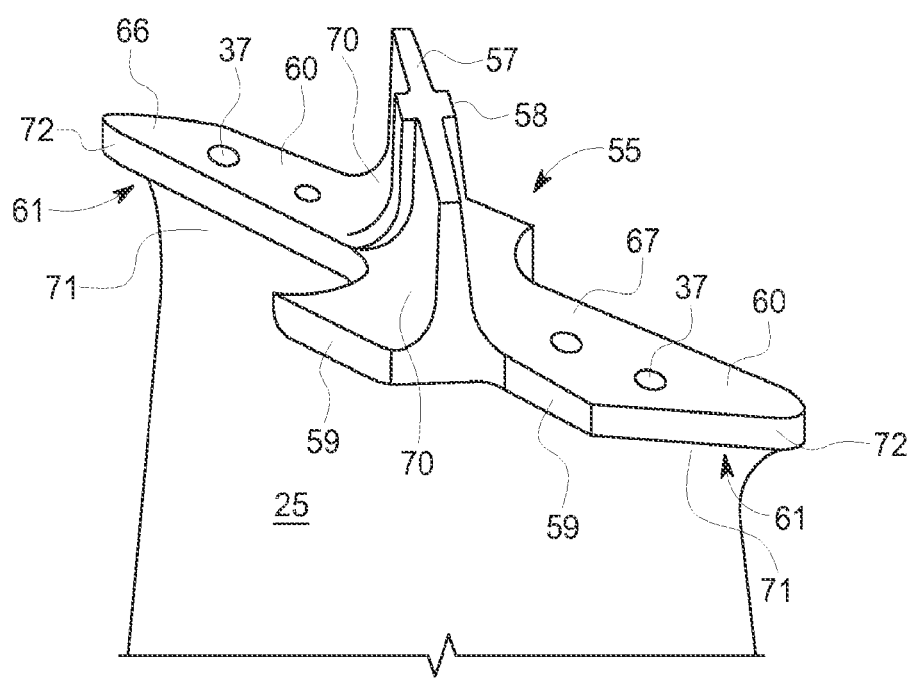
FIG. 9 is a perspective close-up view of the tip shroud of FIG. 8.
Figure 10:
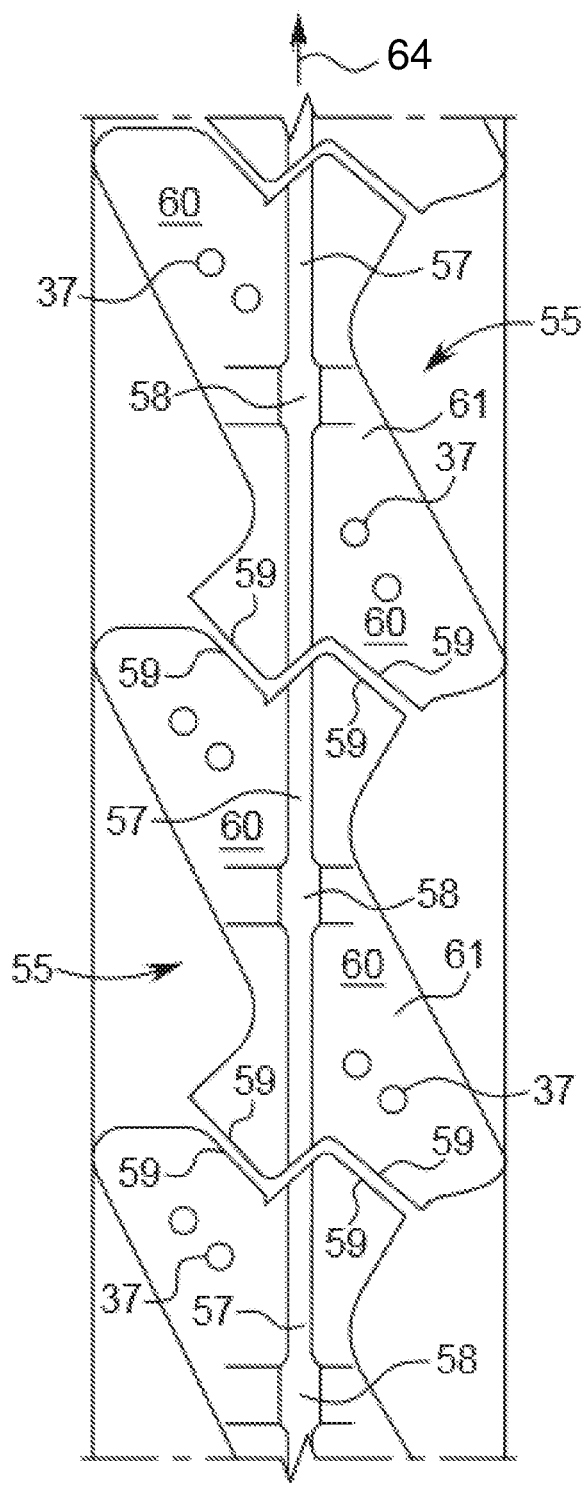
FIG. 10 is a top view of an installed arrangement of tip shrouded turbine rotor blades.

For background purposes, FIGS. 4 through 7 provide views of a turbine rotor blade 16 in which aspects of the present invention may be practiced. As will be appreciated, these figures, along with FIGS. 8 through 10, are provided to illustrate common configurations of rotor blades and the geometrical constraints that affect internal cooling arrangements. As illustrated, the rotor blade 16 includes a root 21 by which the rotor blade 16 may attach to a rotor disc. For example, the root 21 may include a dovetail 22 configured for mounting in a corresponding dovetail slot in the perimeter of a rotor disc. The root 21 may further include a shank 23 that extends between the dovetail 22 and a platform 24. The platform 24, as shown, is disposed at the junction of the airfoil 25 and the root 21, and may be configured to define a portion of the inboard boundary of the flowpath through the turbine 12. It will be appreciated that the airfoil 25 is the active component of the rotor blade 16 that intercepts the flow of working fluid through the turbine 12 and induces the rotor disc to rotate. While the blade of this example is a rotor blade 16, it will be appreciated that, unless otherwise stated, the present invention also may be applied to other types of blades within the gas turbine 10, including stator blades 17. It will be seen that the airfoil 25 of the rotor blade includes a concave pressure side face 26 and a circumferentially or laterally opposite convex suction side face 27 extending axially between opposite leading and trailing edges 28, 29 respectively. The side faces 26 and 27 also extend in the radial direction from the platform 24 to an outboard tip 31 of the airfoil 25.

Figure 4:
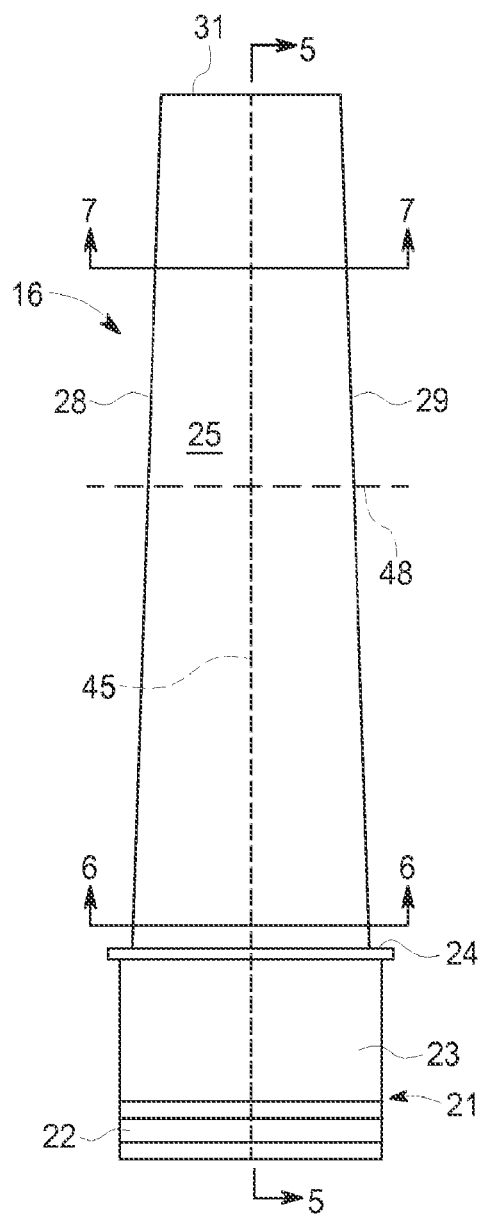
FIG. 4 is a side view of an exemplary turbine rotor blade in which embodiments of the present invention may be used.
Figure 5:
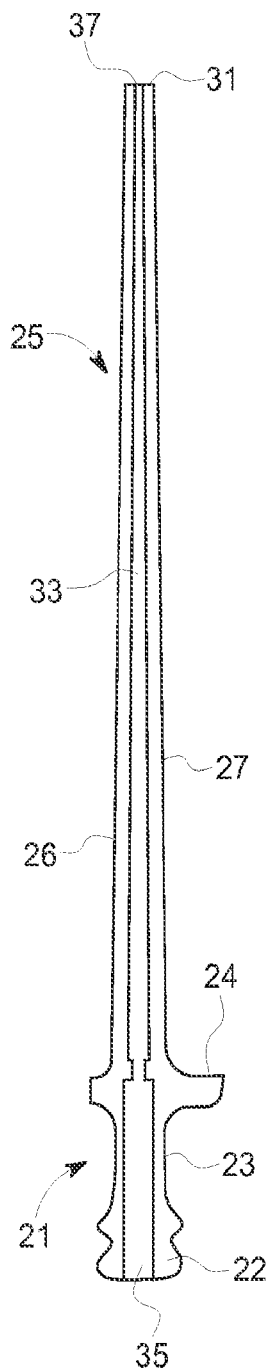
FIG. 5 is a section view along sight line 5-5 of FIG. 4.

The airfoil 25 may include a curved or contoured shape extending between an inboard end (i.e., where the airfoil 25 extends radially from the platform 24) and an outboard tip 31. As illustrated in FIGS. 4 and 5, the airfoil 25 may taper gradually as it extends from the platform 24 to the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the suction side face 26 and the pressure side face 27, as illustrated in FIG. 5. As shown in FIGS. 6 and 7, the contoured shape of the airfoil 25 may further include a twisting about a longitudinal axis as it extends in the radial direction relative to the center axis of the gas turbine. The twisting typically is configured so to vary a stagger angle for the airfoil 25 gradually between the inboard end and outboard tip 31. As also shown, within the airfoil 25, one or more cooling channels 33 may extend radially outward from a connection to a coolant feed 35 formed through the root 21 of the rotor blade 16. At the other end of the cooling channel 33, an outlet port 37 may be formed for discharging the coolant after it has traveled through the rotor blade 16. The cooling channel 33 may be linear, curved or a combination thereof.

FIGS. 8 through 10 illustrate a turbine rotor blade 16 having a tip shroud 55 in which aspects of the present invention may be used. As will be appreciated, FIG. 8 is a perspective view of an exemplary turbine rotor blade 16 that includes a tip shroud 55. FIG. 9 is a close-up view of the tip shroud 55 of FIG. 8, while FIG. 10 is a top view of an exemplary installed arrangement of such tip shrouded turbine rotor blades 16. As illustrated, the tip shroud 55 may be positioned at the outboard tip 31 of the airfoil 25. The tip shroud 55 may include an axially and circumferentially extending flat or substantially flat plate that is supported towards its center by the airfoil 25. The tip shroud 55, as illustrated, may be described as including an outboard surface 60, an inboard surface 61, and a peripheral edge or edge 63 that connects the outboard and inboard surfaces 60, 61. According to certain embodiments, positioned along the top of the tip shroud 55 is a seal rail 57. Generally, as illustrated, the seal rail 57 is a fin-like projection that extends radially outward from the outboard surface 60 of the tip shroud 55. The seal rail 57 may extend circumferentially between opposite ends of the tip shroud 55 in the direction of rotation or "rotation direction" of the rotor blade 16. As will be appreciated, the seal rail 57 may be formed to deter the flow of working fluid through the radial gap that typically exists between the tip shroud 55 and the stationary components that surround the row of rotor blades 16. In some conventional designs, the seal rail 57 may extend into an abradable stationary honeycomb shroud that opposes the it. A cutter tooth 58 may be disposed toward the middle of the seal rail 57 so as to cut a groove in the honeycomb of the stationary shroud that is slightly wider than the width of the seal rail 57.

The tip shroud 55 may include fillet regions 70, 71 that provide smooth transitions between the divergent surfaces of the tip shroud 55 and the airfoil 25, as well as those between the tip shroud 55 and the seal rail 57. More specifically, the tip shroud 55 may include an inboard fillet region 71 between the inboard surface 61 of the tip shroud 55 and the pressure side and suction side faces 26, 27 of the airfoil 25. The tip shroud 55 also may include an outboard fillet region 70 between the outboard surface 60 of the tip shroud 55 and the sides of the seal rail 57. The fillet regions 70, 71, as shown, provide smoothly curved transitions between planar surfaces that are approximately perpendicularly arranged. As will be appreciated, such fillet regions are provided so to spread stress concentrations that would otherwise occur in those areas. Even so, these areas remain highly stressed regions, particularly, given the overhanging load of the tip shroud 55 and the rotational speed of the engine, the inboard fillet region 71. As will be appreciated, without adequate cooling, the stresses in this area may significantly impact the useful life of the component.

As illustrated in FIG. 10, tip shrouds 55 may be formed such that the tip shrouds 55 of neighboring blades 16 make contact during operation. This may be done to reduce leakage and harmful vibration. The tip shroud 55 may scalloped shape. FIG. 10 illustrates an outboard view of turbine rotor blades 16 as they might appear when assembled on a rotor disk, and provides an example of a conventional arrangement of an interface between neighboring tip shrouds 55. As will be appreciated, two full neighboring tip shrouds 55 are shown with an arrow indicating the rotation direction 64. The trailing edge of a leading tip shroud may contact or come in close proximity to the leading edge of a trailing tip shroud. (Note that in this context, "trailing" and "leading" describe position relative to a rotation direction.) This area of contact is generally referred to as an interface or contact face 59. Given the profile of the exemplary configuration of FIG. 10, the contact face 59 may be referred to as a Z-interface. Those of ordinary skill in the art will appreciate that the reference to turbine blade 16 and the tip shroud 55 of FIG. 10 is exemplary only and that other turbine blades and tip shrouds of different configurations may be used with the embodiments of the current application.

The tip shroud 55, as further indicated, may include outlet ports 37 that are formed through the outboard surface 60 of the tip shroud. The outlet ports 37 may serve to discharge the coolant flowing through the cooling channels 33. Pursuant to conventional design, however, the outlet ports 37 are steeply angled or perpendicular to the outboard surface 60 of the tip shroud 55. Given the configuration of the tip shroud 55 and the orientation of the outboard surface 60 thereof, this results in the outlet ports 37 discharging coolant in a direction that is substantially perpendicular to the direction of flow through the turbine 12. As will be appreciated, this creates aerodynamic losses at the tip shroud 55 because the discharge flowing from the outlet ports 37 disturbs and impedes the flow through the hot gas path.

Figure 11:
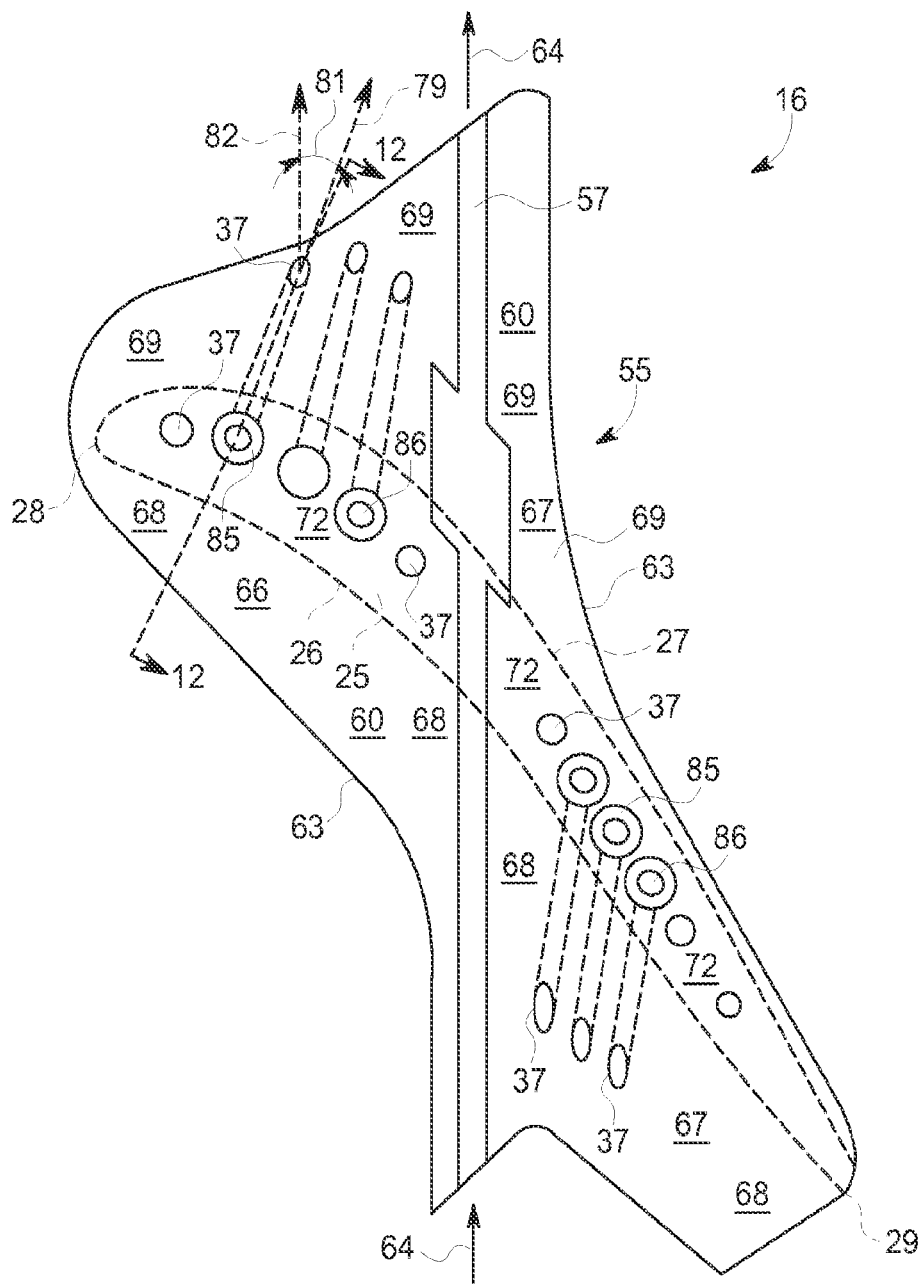
FIG. 11 is a top view of a tip shrouded turbine rotor blade that includes a cooling configuration according to certain aspects of the present invention.
Figure 12:
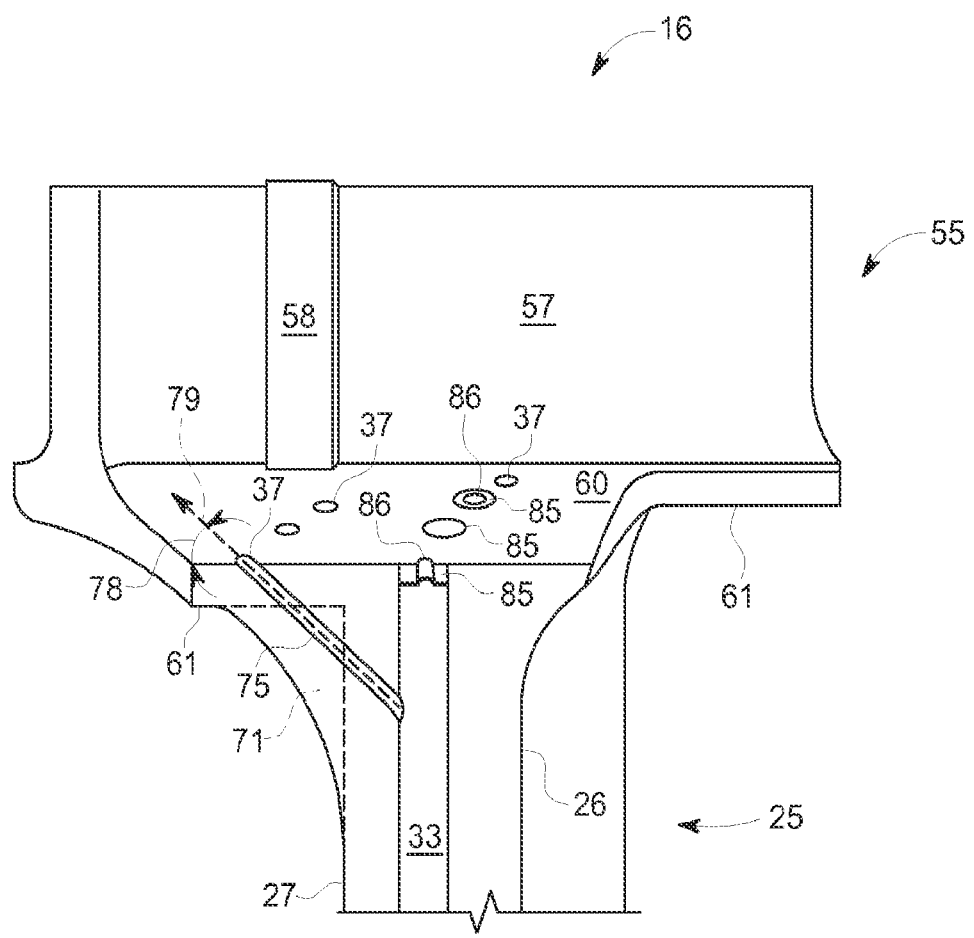
FIG. 12 is a sectional perspective view along sight line 12-12 of FIG. 11.

Turning now to FIGS. 11 and 12, an exemplary embodiment of the present invention is illustrated. As will be appreciated, FIG. 11 is a top view of a tip shrouded turbine rotor blade 16 that includes an internal cooling configuration according to certain aspects of the present invention, and FIG. 12 is a sectional perspective view along sight line 12-12 of FIG. 11. As illustrated, the airfoil 25 may include multiple interior cooling channels 33, such as those already described, which extend radially through the airfoil 25 to outlet ports 37 formed through the outboard surface 60 of the tip shroud 55. According to a preferred embodiment, the present invention may further include one or more canted or obliquely arranged cooling passages that branch from connections made with the cooling channels 33 and/or discharge coolant air in the manner described herein. Such cooling channels will be referred to as "branching cooling passages" or "branching passages 75". As illustrated, each of the branching passages 75 may elongate between a connection to one of the cooling channels 33 and an outlet port 37 formed through an outer surface of the tip shroud 55. The branching passages 75 may have a cross-sectional flow area that is less than that of the cooling channel 33 to which each connects. The branching passages 75 may be linear, though curved configurations are also possible, and each may be configured to define an internal cooling passage near the outboard surface 60 of the tip shroud 55. As will be appreciated, arranged in this way, the branching passages 75 may have a cooling effect to a large area of the outboard surface 60 of the tip shroud 55 than would otherwise be possible.

According to exemplary embodiments, the branching passages 75 may be oriented to discharge coolant at an oblique or shallow angle relative to the outboard surface 60 of the tip shroud 55. More specifically, as indicated in FIG. 12, the branching passages 75 may be configured so that a shallow discharge angle 78 is defined between a discharge direction 79 from the outlet port 37 and the outboard surface 60 of the tip shroud 55. To achieve this, the branching passage 75, may be configured such that an outlet section (i.e., the section of the branching passage 75 near the outboard surface 60 that terminates at the outlet port 37) define a central axis that forms a shallow angle relative to the outboard surface 60 of the tip shroud 55. Another way to describe the arrangement is that a continuation of the central axis of the outlet section forms a shallow angle relative to the outboard surface 60 that immediately surrounds the outlet port 37. As will be appreciated, the particular size of the discharge angle 78 may vary, and the optimal value or range may be dependent upon specific design criteria, the configuration of the tip shroud, cooling requirements, etc. Additionally, while the cooling performance of such branching passages 75 may be optimized or enhanced at specific values or within certain ranges of discharge angle 78, desirable performance benefits may be achieved across a wide spectrum of values. With that stated, applicants have determined several preferred embodiments that are particularly advantageous when used in conjunction with many common configurations of tip shrouded turbine blades, and these embodiments will now be disclosed. According to one, for example, the discharge angle 78 of the branching passage 75 includes a range of between about 10° and 60°. According to another preferred embodiment, the discharge angle 78 includes a range of between about 20° and 45°. According to another embodiment, the discharge angle 78 includes a range of less than 45°. As will be appreciated, the discharging of coolant at such shallow angles relative to the outboard surface 60 may reduce the radially outward directional component of the discharged coolant. This may reduce aerodynamic mixing losses given that less disruption to the axial flow through the turbine would be caused. Additionally, the discharge angle 78 of the present invention would reduce the tendency for such coolant to enter the flowpath on the pressure side of the airfoil 25, which may further reduce mixing losses. A more radially oriented discharge of coolant also may induce leakage flows of working fluid over the seal rail 57, but the shallower discharge angle 78 of the present invention may reduce this tendency. Additionally, the shallow discharge angle 78 may promote or enhance film cooling effects of coolant discharged from the outboard surface 60 of the tip shroud 55.

As discussed in more detail below, according to alternative embodiments, the discharge direction 79 of the outlet port 37 of the branching passages 75 may be aligned relative to the rotation direction 64 of the rotor blades 16 during operation. As used herein, the "rotation direction" refers to the direction of rotation for the rotor blade during typical or expected operation once it is installed in a gas turbine. As indicated in FIG. 11, according to certain preferred embodiments, the branching cooling passages 75 may be configured so to discharge coolant in a direction that is parallel or aligned at a shallow angle to the rotation direction 64. More specifically, as illustrated and in accordance with certain embodiments, the branching passages 75 may be configured so that a shallow discharge angle 81 is defined between the discharge direction 79 from the outlet port 37 of the branching passage 75 and a reference line 82 that is with the rotation direction 64. To achieve this, the branching passage 75 may include an outlet section adjacent to the outboard surface 60 that has a central axis that is aimed in the approximate direction as the rotation direction 64, as indicated. According to preferred embodiments, the discharge angle 81 of the branching passage 75 is less than approximately 45°. The discharge angle 81 may be formed to either side of the reference line 82. Pursuant to a preferred embodiment, as illustrated, the discharge angle 81 may be canted in the downstream direction, as this orientation may further reduce aerodynamic mixing losses. According to another embodiment, the discharge angle 81 is less than approximately 20° to either side of the reference line 82. Alternatively, the discharge angle 81 is within 5° of the reference line 82. The shallow discharge angle 81 may be formed with the reference line 82 pointing with the rotation direction 84, as is the case of the branching passages 75 of FIG. 11 formed on the side of the tip shroud 55 overhanging the leading edge 28 of the airfoil 25. Alternatively, the shallow discharge angle 81 may be formed with the reference line 82 pointing against the rotation direction 84, as is the case of the branching passages 75 of FIG. 11 formed on the side of the tip shroud 55 overhanging the trailing edge 29 of the airfoil 25.

For descriptive purposes and as indicated in FIGS. 11 and 12, the outboard surface 60 of the tip shroud 55 may be described as having different regions or areas based on the relative position of the area to the seal rail 57 and/or the structure of the airfoil 25 that the area overhangs. For example, the seal rail 57 may be described as dividing the tip shroud 55 into a leading portion 66, which, as used herein, is the portion extending in the forward direction from the seal rail 57 so to overhangs the leading edge 28 of the airfoil 25, and a trailing portion 67, which, as used herein, is the portion extending in the aft direction from the seal rail 57 so to overhangs the trailing edge 29 of the airfoil 25. Additionally, the profile of the airfoil or "airfoil profile", as shown in the several top views (such as FIG. 11), may be described as dividing the tip shroud 55 into a pressure side portion 68, which, as used herein, is the portion of the tip shroud 55 that cantilevers out from the pressure side face 26 of the airfoil 25, and a suction side portion 69, which, as used herein, is the portion of the tip shroud 55 that cantilevers out from the suction side face 27 of the airfoil 25. Finally, an airfoil portion 72 is the central region of the outboard surface 60 that coincides within the airfoil profile. As used herein, the "airfoil profile" refers to the outline of the airfoil 25 projected through the outboard surface 60 of the tip shroud 55, as indicated by the dashed line in FIGS. 11 and 14.

According to exemplary embodiments, multiple branching passages 75 and the outlet ports 37 related thereto may be included on each of the leading portion 66 and trailing portion 67 of the tip shroud 55. According to preferred embodiments, each of the branching passages 75 on the leading portion 66 of the tip shroud 55, from the connection it makes with the cooling channel 33, may extend in the rotation direction 64. Given this arrangement and the definitions of the different areas of the tip shroud 55, the outlet ports 37 may be described as being located within the region of the outboard surface 60 of the tip shroud 55 defined by the intersection of the leading portion 66 and the suction side portion 68. One advantage of this arrangement is that, being discharged in this way, the coolant is directed or aimed toward the suction side face 27 of the airfoil 25 and, thus, is more likely to enter the flowpath along the edge of the tip shroud 55 that overhangs the suction side face 27 of the airfoil 25. As will be appreciated, this reduces aerodynamic losses given that reentry along the pressure side face 26 results in greater flowpath disruption. Additionally, coolant introduced nearer the lower pressure region near the suction side face 27 of the airfoil 25 is more likely to become part of the flow of working fluid through the turbine 12 and less apt to induce leakage flow over the seal rail 57. According to preferred embodiments, the branching passages 75 on the trailing portion 67 of the tip shroud 55 may extend against or into the rotation direction 64 from the connection each makes with the cooling channel 33. As will be appreciated, this arrangement may be somewhat necessitated by the geometrical constraints of a particularly shaped tip shroud 55 (as illustrated). As will be appreciated, the aerodynamic conditions on the trailing portion 67 of the tip shroud 55 may be different than those on the leading portion 66, and these differences typically mean that the aerodynamic advantageous discussed above in relation to alignment with the rotation direction are less impactful.

According to another aspect of the present invention, one or more of the branching passages 75 may be configured so to intersect the inboard fillet region 71. As shown in the exemplary arrangement of FIG. 12, the branching passage 75 may be configured so that it extends through the inboard fillet region 71, which is typically formed between the inboard surface 61 of the tip shroud 55 and the suction side face 26 of the airfoil 25. As discussed, this arrangement may be particularly advantageous because the fillet region is a difficult area to cool, but one that is highly stressed during operation. As provided in FIG. 13, the cooling requirements of the fillet region 71 and the surrounding area may be further addressed via adding a second branching passage 75. In such cases, as shown, the outlet port 37 of the branching passage 75 may be formed through the edge 63 of the tip shroud 55. This may be done as a way to achieve further cooling benefits to the area and allow greater coverage within the fillet region 71. As will be understood, improving tip shroud temperatures in highly stressed or creep-critical locations, such as the fillet region 71, will increase component longevity, while the efficient usage of coolant will improve aerodynamic stage efficiency. Applicants have confirmed such performance benefits through thermal profile studies, structural creep analyses, and computational fluid dynamics analysis.

As will be appreciated, the cooling configurations of the present application may enable efficient manufacturing processes for their manufacture pursuant to other aspects of the present invention. As will be apparent to those skilled in the art, these methods may include combining features that are manufactured during the casting processes with other features that may be created after the casting of the rotor blade is complete via post-cast processes. Post-cast processes may include drilling, machining, attaching non-integral parts to cast components, etc. These different processes may be combined so to leverage the advantages of each for cost-effectively producing the complex cooling arrangements described herein. It will be realized that such techniques may be used to manufacture new rotor blades or retrofit existing ones so to conform to the configurations described herein. For example, according to certain preferred embodiments, the cooling channels 33 may be formed via conventional casting processes, while the branching passages 75 are configured as post-cast features, which may include conventional mechanical drilling processes as well as controllable electrochemical or electric discharge machining processes.

Figure 13:
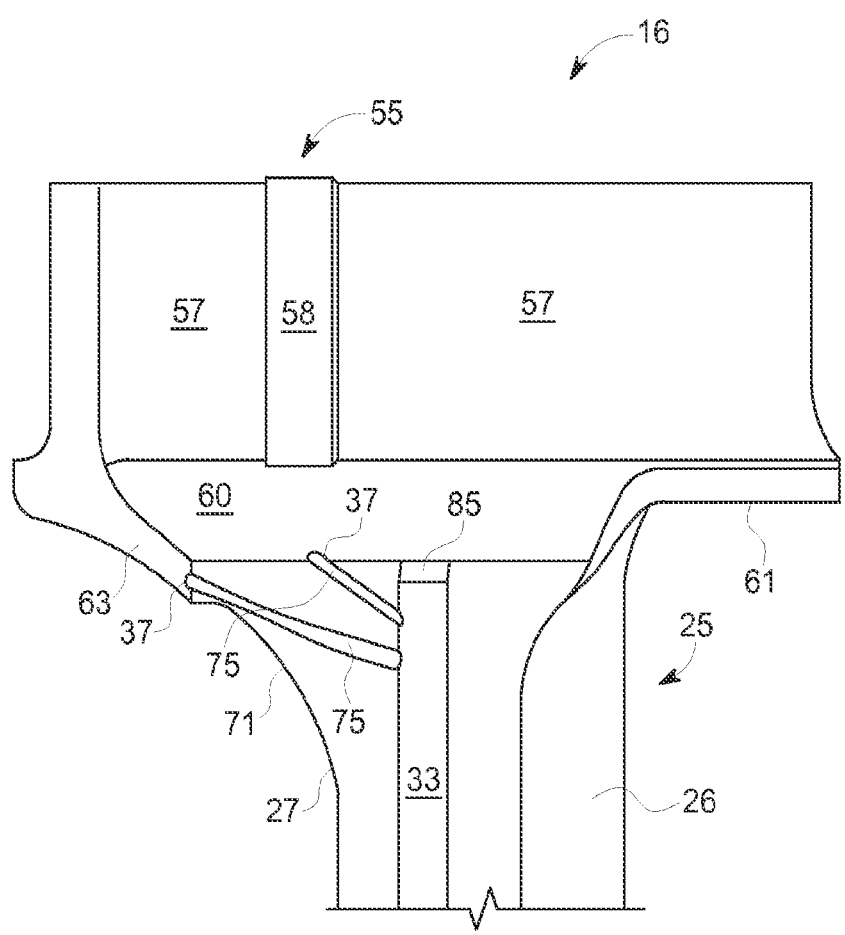
FIG. 13 is a sectional perspective view of a tip shrouded turbine rotor blade that includes a cooling configuration according to alternative aspects of the present invention.
Figure 14:
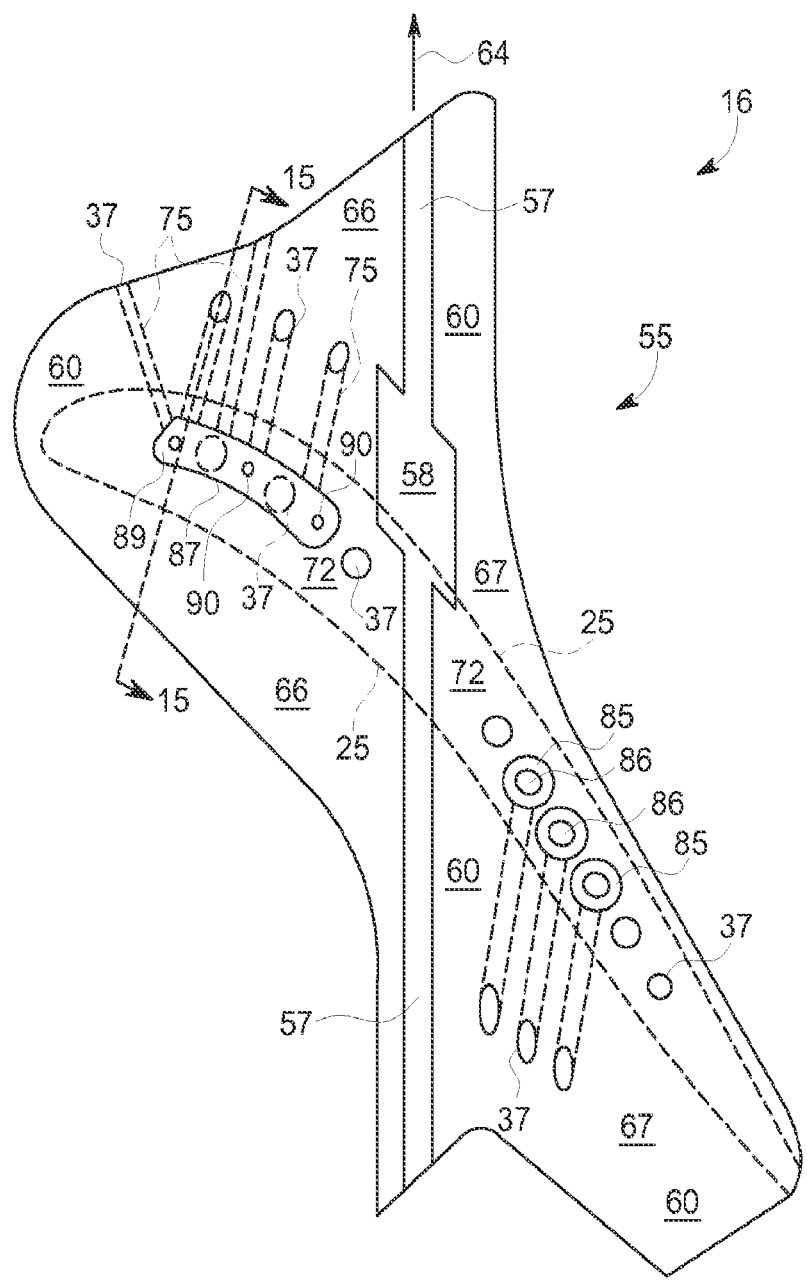
FIG. 14 is a top view of a tip shrouded turbine rotor blade that includes a cooling configuration according to an alternative embodiment of the present invention.
Figure 15:
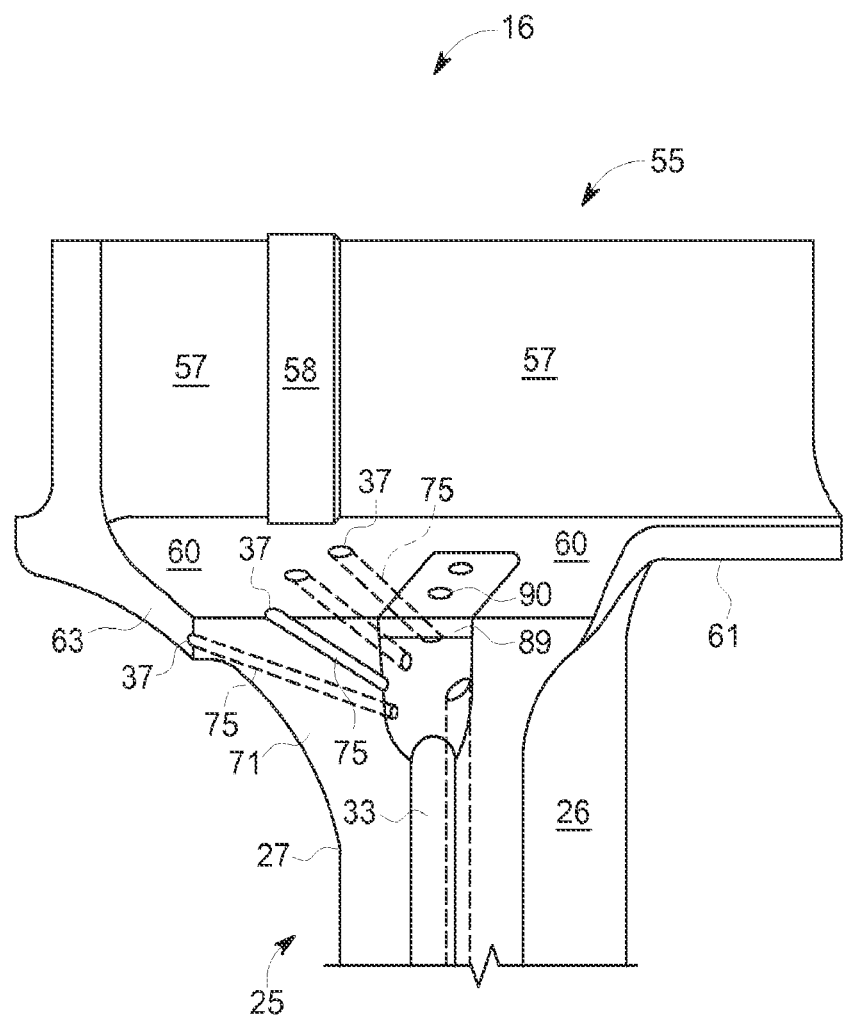
FIG. 15 is a sectional perspective view along sight line 15-15 of FIG. 14.

As illustrated in FIGS. 11 and 12—and with further reference to the embodiments of FIGS. 13 through 15—the cooling channels 33 and the branching passages 75 may include a variety of outlet port 37 features for desirably distributing coolant flow through the tip shroud 55. As will be appreciated, these features may be manufactured after casting processes are used to form the rotor blade 16, and thus may be referred to herein as a post-cast feature. For example, the outlet ports 37 may be capped by a non-integral plug 85 that is installed via conventional means, such as welding, brazing, or mechanical fitting, after the turbine blade 16 and the cooling channels 33 defined therein are manufactured via conventional casting processes. More specifically, one or more of the cooling channels 33 may be capped by a non-integral plug 85 that is configured so that, upon installation, a surface of the plug 85 resides flush relative to the outboard surface 60 of the tip shroud 55 and, thereby, defines a portion that surface. According to alternative embodiments, the plug 85 may partially or completely cap the cooling channel 33 to which it corresponds. For example, as illustrated in FIG. 12, the plug 85 partially caps the cooling channel 33. In such cases, the plug 85 is configured so to define a plug port 86 that has a cross-sectional flow area that is less than the cross-sectional flow area that would otherwise be defined by the uncapped outlet port 37 of the cooling channel 33. Alternatively, FIG. 13 provides a sectional perspective view of a tip shrouded turbine rotor blade 16 that includes a cooling configuration according to an alternative embodiment in which a plug 85 completely caps the cooling channels 33 to which it corresponds. More specifically, the plug 85 is configured to block the opening of the cooling channel 33 so that substantially the entire supply of coolant is directed into the one or more branching passages 75 that are connected to the cooling channel 33. As shown, FIG. 13 also provides an example of a cooling configuration according to the present invention in which multiple branching passages 75 connect to a single cooling channel 33.

FIG. 14 is a top view of a tip shrouded turbine rotor blade that includes a cooling configuration according to an alternative embodiment of the present invention, and FIG. 15 provides a sectional perspective view along sight line 15-15 of FIG. 14. As illustrated, in this case a supply plenum 87 may be formed near the outboard surface 60 of the tip shroud 55. The supply plenum 87 may be configured to supply coolant to multiple branching passages 75 that connect to and extend from it. The supply plenum 85 may be supplied coolant by one or more of the cooling channels 33 that extend through the airfoil 25. From the supply plenum 87, the coolant may be desirably distributed and metered to the branching passages 75 that connect to the supply plenum 85. As illustrated in FIG. 15, the multiple branching passages 75 that connect to the supply plenum 87 may include several different sizes and alignments. Several of the branching passages 75 may intersect the outboard surface 60 of the tip shroud 55 and form outlet ports 37 thereon, as already described. Other of the branching passages 75 may extend to outlet ports 37 formed on the edge 63 of the tip shroud 55.

According to certain preferred embodiments, the supply plenum 87 may be enclosed by a non-integral plenum cover 89. The plenum cover 89 may function relative to the supply plenum 87 similar to the manner in which the non-integral plugs 85 function relative to the cooling channels 33. For example, the plenum cover 89 may enclose the supply plenum 87 completely or, as illustrated, partially. More specifically, the plenum cover 89 may include several cover ports 90 for releasing a portion of the coolant delivered to the supply plenum 87. As will be appreciated, the relative cross-sectional sizing of the cover ports 90 through the plenum cover 87, the branching passages 75 that extend to the outlet ports 37 formed through the outboard surface 60 of the tip shroud 55, and/or the branching passages 75 that extend to the outlet ports 37 formed through the edge 63 of the tip shroud 55 may be configured so to produce a desired coolant distribution through and around the tip shroud. Such distribution may take into account flow levels through the branching passages 75 and discharge levels needed for cooling along exterior regions of the tip shroud 55. As with each of these exemplary embodiments, the performance advantages may include increased part life, decreased risk of failure, and minimized risk of forced outage. According to the several embodiments discussed herein, the branching passages 75 of the present invention may operate to reduce local tip shroud temperatures as well as improved stage aerodynamic efficiency by reducing the coolant supply needed to maintain the component at desired temperature levels.

With reference now to FIGS. 16 through 24, an alternative aspect of the present invention is disclosed. As will be appreciated, FIGS. 16 and 17, respectively, illustrate top and perspective views of a tip shroud 55 having an exemplary embodiment of flow directing structure that may be employed for beneficially directing coolant discharged from the outboard surface 60 of the tip shroud 66. According to certain embodiments, the flow directing structure includes a shroud fence 91. The shroud fence 91 may be configured to limit mixing or aerodynamic losses as well as reduce cooling inefficiencies associated with the release of coolant from tip shrouds. More specifically, according to certain preferred embodiments, the shroud fence 91, as illustrated, may be configured on the outboard surface 60 of the tip shroud 55 near one or more of the outlet ports 37. As will be appreciated, the shroud fence 91 may be used in conjunction with the tip shroud cooling features discussed above in relation to FIGS. 11 through 15. Alternatively, the shroud fence 91 also may be used separately.

The shroud fence 91, according to an exemplary embodiment, may include an elongated projecting, fence-like structure that extends along a path defined on the outboard surface 60 of the tip shroud 55. The shroud fence 91 may include steep sides relative to the outboard surface 60. Relative to the path length of the shroud fence 91, the shroud fence 91, as illustrated, may have a relatively short height (i.e., the dimension extending in the approximate radial direction) and narrow thickness (i.e., the dimension extending in the approximate circumferential direction). As an example, the radial height of the shroud fence 91 may be described by comparing it to the radial height of the seal rail 57. As shown, the radial height of the shroud fence 91 is less than half the radial height of the seal rail 57. According to preferred embodiments, the radial height of the shroud fence 91 may be less than about 0.3 of the radial height of the seal rail 57. More preferably, the radial height of the shroud fence 91 may be between about 0.05 and 0.25 the radial height of the seal rail 57. The thickness of the shroud fence 91, according to exemplary embodiments, may be less than the radial height. The radial height and thickness of the shroud fence 91 may be the same or approximately the same as the shroud fence 91 extends along the outboard surface 60 of the tip shroud 55. As should be understood, configurations that include variable heights and thicknesses are also possible. For example, as illustrated, the shroud fence 91 may taper at one end. Additionally, according to certain embodiments, the shroud fence 91 may extend continuously along the path it makes on the outboard surface 60, i.e., from one end to the other without breaks. Alternatively, configurations that include intermittent breaks in the shroud fence 91 are also possible.

Figure 16:
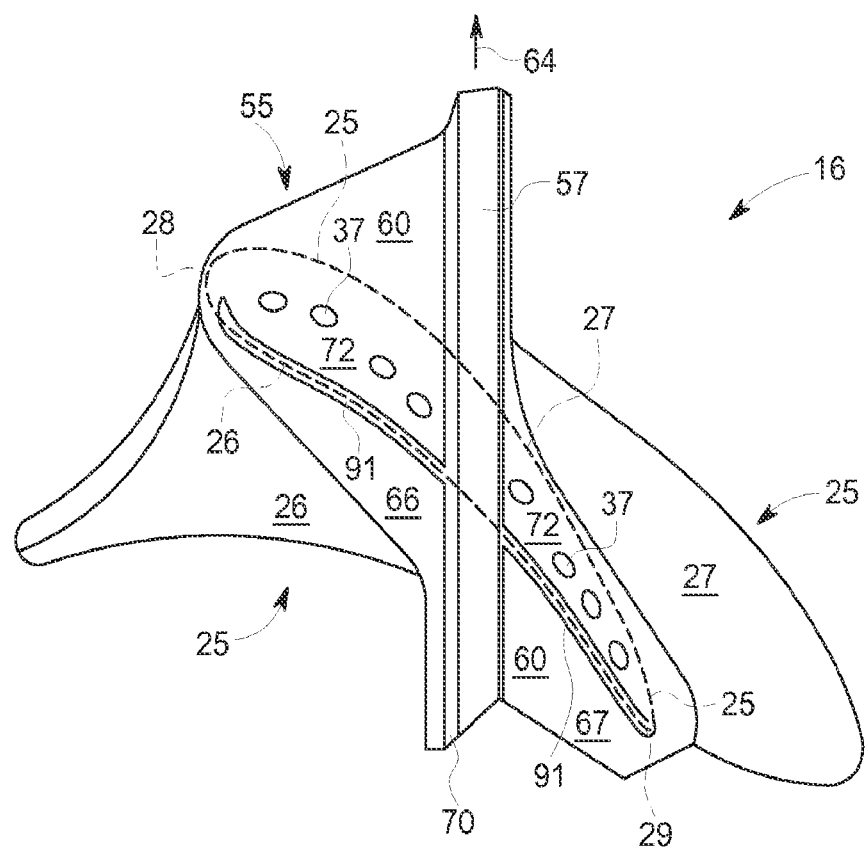
FIG. 16 is a top view of a tip shrouded turbine rotor blade that includes a tip shroud configured according to an alternative embodiment of the present invention.
Figure 17:
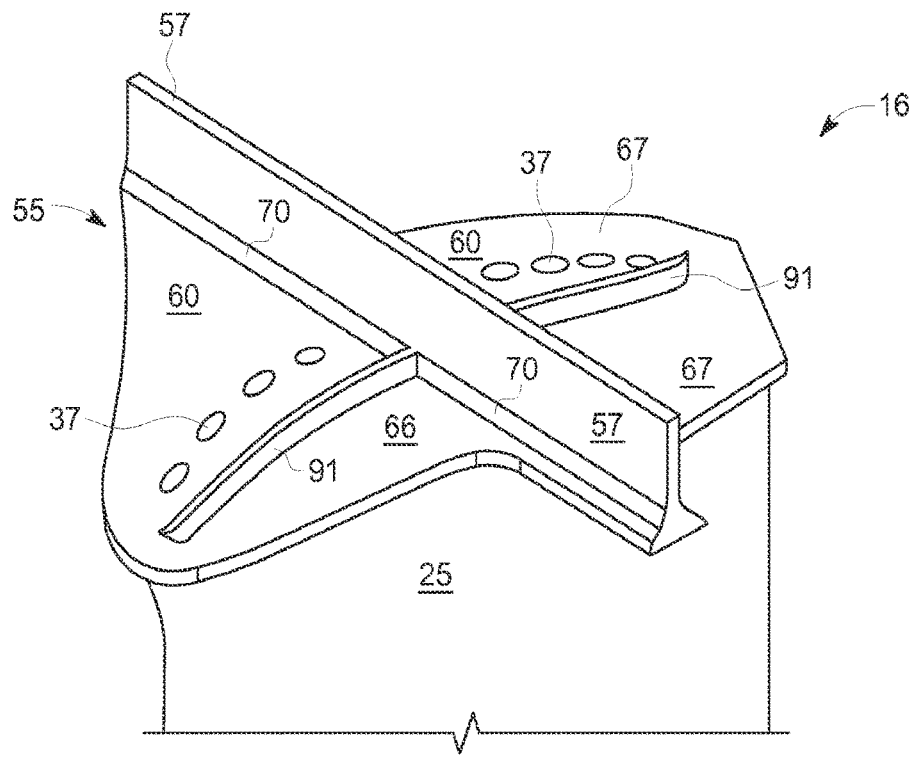
FIG. 17 is a perspective view of the tip shrouded turbine rotor blade of FIG. 16.

As illustrated, the shroud fence 91 may be aligned approximately perpendicular or at a steep angle relative to the rotation direction of the rotor blade 16, which, in FIG. 16, is indicated by the alignment of the seal rail 57. The shroud fence 91 may be included on one or both of the leading portion 66 and the trailing portion 67 of the tip shroud 55. With regard to the leading portion 66 of the tip shroud 55, the shroud fence 91 may extend from an aft end disposed near the seal rail 57 to a forward end positioned near the peripheral edge or edge 63 of the tip shroud 55. More particularly, according to the embodiment of FIG. 16, the shroud fence 91 may extend axially from an aft end that abuts or connects to the seal rail 57 to a forward end that tapers to a point positioned near the edge 63. According to preferred embodiments, the tapering point of the forward end may be positioned so that it overhangs the leading edge 28 of the airfoil 25. With regard to the shroud fence 91 on the trailing portion 67 of the tip shroud 55, it may extend from a forward end positioned near the seal rail 57 to an aft end positioned near the edge 63 of the tip shroud 55. More particularly, as illustrated in FIG. 16, the shroud fence 91 may extend axially from a forward end that abuts or connects to the seal rail 57 to an aft end that tapers to a point disposed near the edge 63 of the tip shroud 55. According to preferred embodiments, the tapering point 63 of the aft end may be positioned so that it overhangs the trailing edge 29 of the airfoil 25.

As previously discussed, the outboard surface 60 of the tip shroud 55 may include one or more outlet ports 37 that connect to cooling channels 33 extending through the airfoil 25. These outlet ports 37, as illustrated, may be arrayed across the outboard surface 60 of the tip shroud 55 and, typically, are disposed within the airfoil profile of the outboard surface 60. As noted above, the airfoil profile refers to the outline of the airfoil projected radially on to the outboard surface 60 of the tip shroud 55, which is indicated by the dashed line in FIGS. 16 and 17, and may be referred to as the airfoil portion 72 of the outboard surface 60 of the tip shroud 55. According to a common arrangement, as further illustrated, the outlet ports 37 may be arranged along the approximate camber line of the airfoil. In accordance with exemplary embodiments, the shroud fence 91 may be configured along a path that coincides approximately with the airfoil profile or a section or segment thereof. As shown in FIG. 16, according to preferred embodiments, the shroud fence 91 extends from the seal rail 57 along a path that coincides with the profile of the pressure side 26 of the airfoil 25. As will be appreciated, given the direction of the rotation, this configuration results in the shroud fence 91 rotationally trailing the outlet ports 37 (i.e., the shroud fence 91 trails the outlet ports 37 as the rotor blade 16 rotates during operation). According to preferred embodiments, the shroud fence 91 may be configured so to rotationally trail each of the outlet ports 37 or, at least, a plurality thereof. As illustrated in FIG. 16, the shroud fence 91 on the leading portion 66 of the tip shroud 55 may be described as extending across or spanning an axial range defined between a forward most outlet port 37 and an aft most outlet port 37. Similarly, in regard to the trailing portion 66 of the tip shroud 55, the shroud fence 91 may span an axial range defined between a forward most outlet port 37 and an aft most outlet port 37. Other configurations are also possible.

Figure 18:
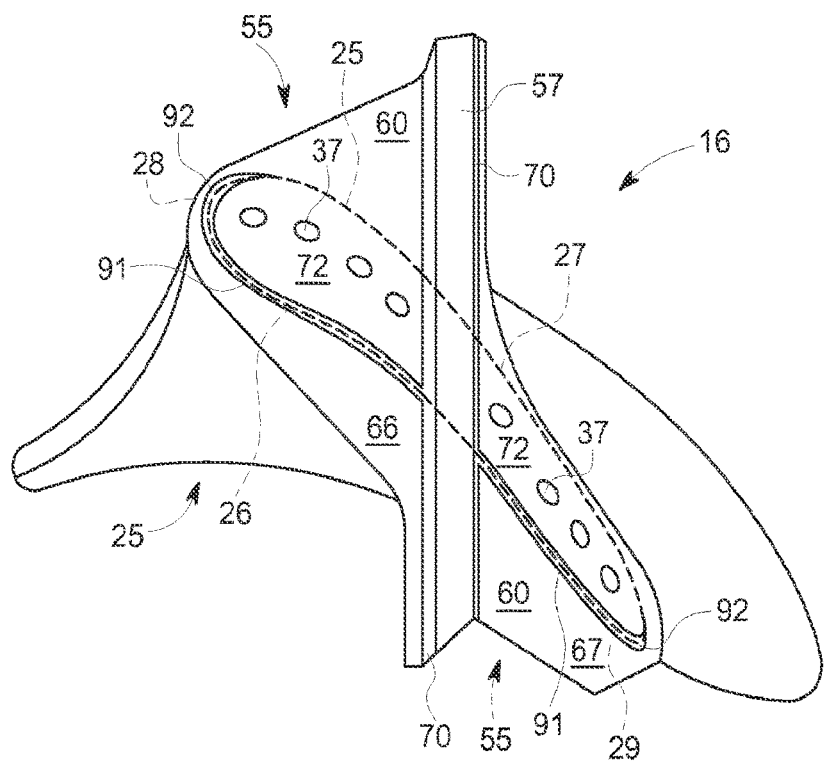
FIG. 18 is a top view of a tip shrouded turbine rotor blade that includes a tip shroud configured according to an alternative embodiment of the present invention.
Figure 19:
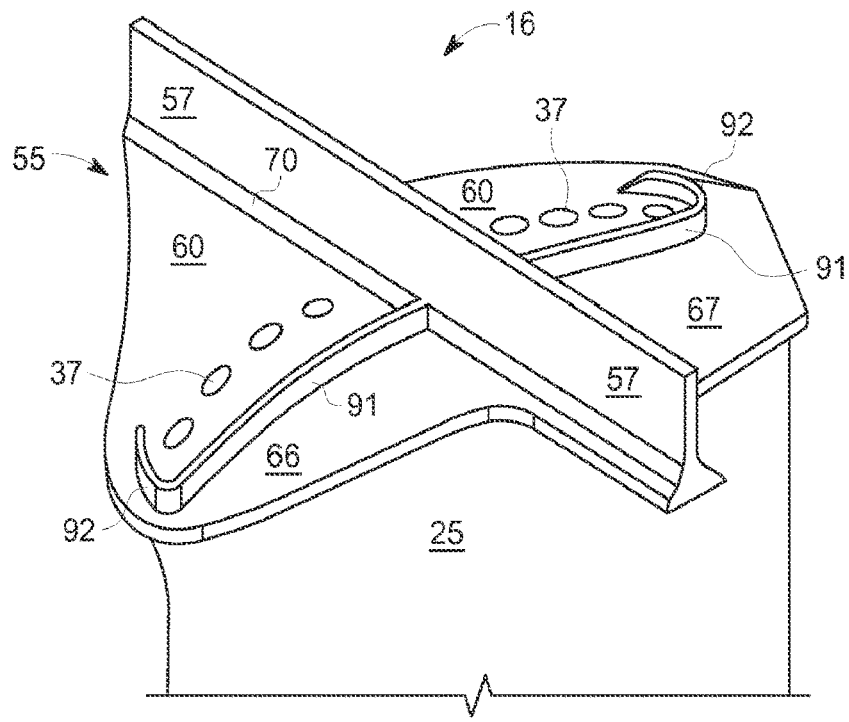
FIG. 19 is a perspective view of the tip shrouded turbine rotor blade of FIG. 18.

With reference now to FIGS. 18 and 19, an alternative configuration of the shroud fence 91 is shown. As illustrated, the end of the shroud fence 91 may include a wrapping tail 92 that wraps or curves around one of the outlet port 37. According to preferred embodiments, this outlet port 37 may be the one positioned furthest from the seal rail 57. Thus, with regard to the shroud fence 91 on the leading portion 66 of the tip shroud 55, the shroud fence 91 may extend from an aft end disposed near the seal rail 57 to a forward end that includes the wrapping tail 92, which may be terminate near the edge 63 of the tip shroud 55. According to certain preferred embodiments, the shroud fence 91 extends axially from an aft end that abuts or connects to the seal rail 57 to a forward end that at least partially wraps around the forward most outlet port 37. With regard to the shroud fence 91 on the trailing portion 66 of the tip shroud 55, the shroud fence 91 may extend from a forward end disposed near the seal rail 57 to an aft end that includes the wrapping tail 92, which may be terminate near the edge 63 of the tip shroud 55. According to certain preferred embodiments, the shroud fence 91 may extend axially from a forward end that abuts or connects to the seal rail 57 to an aft end that at least partially wraps the aftward most outlet port 37.

Figure 20:
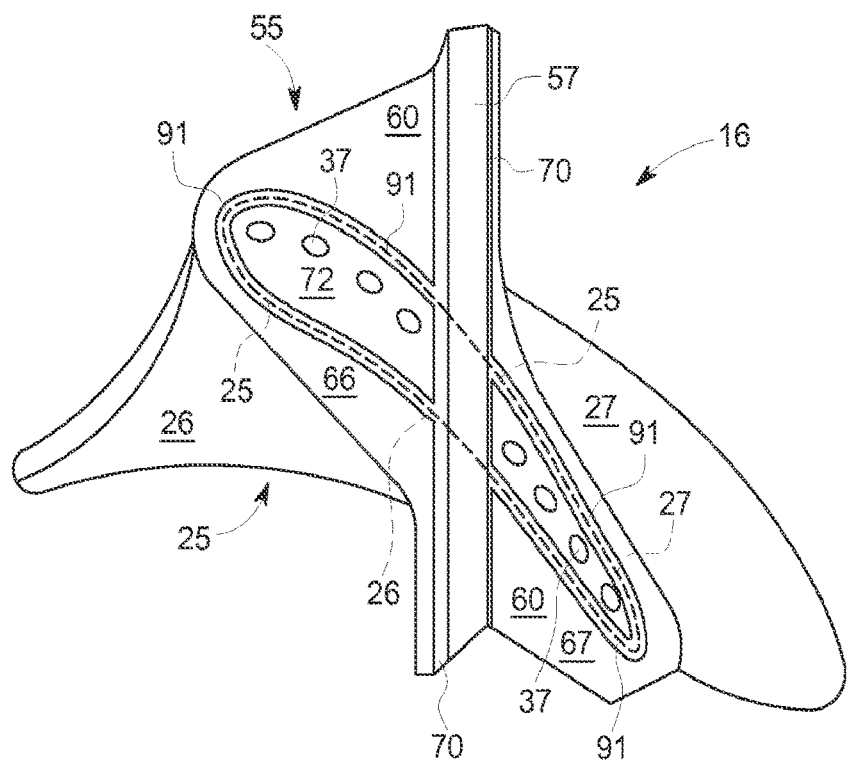
FIG. 20 is a top view of a tip shrouded turbine rotor blade that includes a tip shroud configured according to an alternative embodiment of the present invention.
Figure 21:
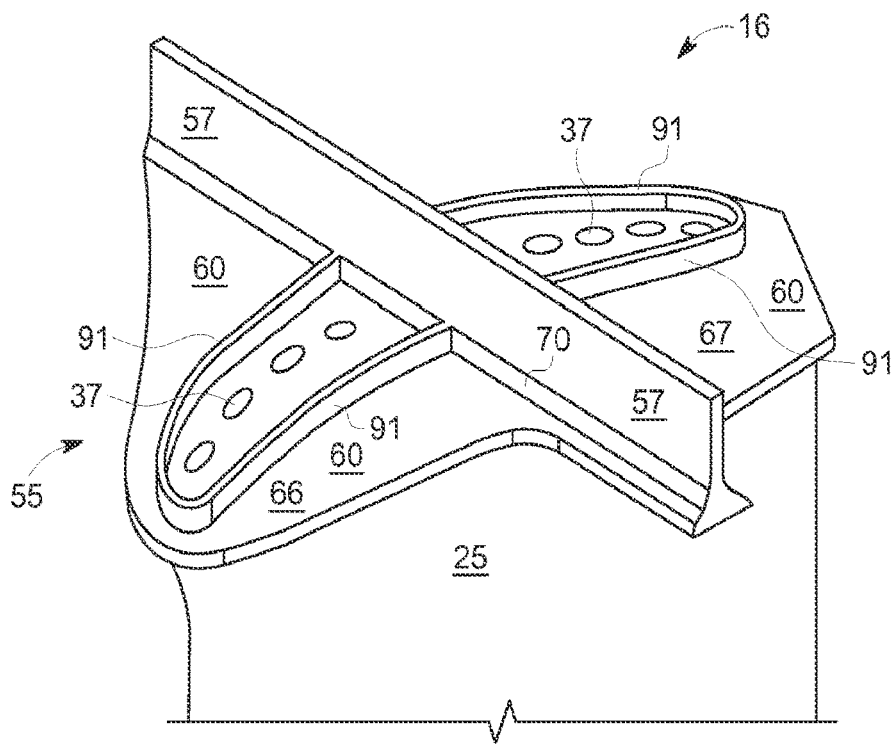
FIG. 21 is a perspective view of the tip shrouded turbine rotor blade of FIG. 20.

With reference now to FIGS. 20 and 21, another alternative configuration of the shroud fence 91 is shown. As illustrated, in this case, the path of the shroud fence 91 on the outboard surface 60 surrounds and substantially enclose a region defined thereupon. This enclosed region may be located on either side of the seal rail 57. Thus, in regard to the leading portion 66 of the outboard surface 60, the shroud fence 91 extends from a first end disposed near the seal rail 57 toward the edge 63 of the tip shroud 55 and, from there, loop back to a second end that is also positioned near the seal rail 57. More particularly, the shroud fence 91 on the leading portion 66 may extend axially from a first end that abuts or connects to the seal rail 57 to a position on the outboard surface 60 that approximately overhangs the leading edge 28 of the airfoil 25. From that position, the shroud fence 91 continues by curving sharply back toward the seal rail 57 and extend to a second end that abuts or connects to the seal rail 57. Similarly, in regard to the trailing portion 67 of the tip shroud 55, the shroud fence 91 may extend from a first end disposed near the seal rail 57 toward the edge 63 of the tip shroud 55 and, from there, loops back to a second end positioned near the seal rail 57. More particularly, as illustrated, the shroud fence 91 may extend axially from a first end that abuts or connects to the seal rail 57 to position on the outboard surface 60 that approximately overhangs the trailing edge 29 of the airfoil 25. From that position, the shroud fence 91 continues by curving sharply back toward the seal rail 57 and extending to a second end that abuts or connects to the seal rail 57. According to certain preferred embodiments, the region enclosed on the outboard surface 61 by the shroud fence 91 may coincide with the airfoil profile. That is, to each side of the seal rail 57, the path of that the looped shroud fence 91 may conform to the airfoil profile. Thus, on the leading portion 66 of the tip shroud 55, the shroud fence 91 approximates the shape of the leading half of the airfoil 25, while on the trailing portion 67 of the tip shroud 55, the shroud fence 91 approximates the shape of the trailing half of the airfoil 25. According to certain preferred embodiments, the region enclosed by the shroud fence 91 may include several of the outlet ports 37 of the radially extending cooling channels 33.

Figure 22:
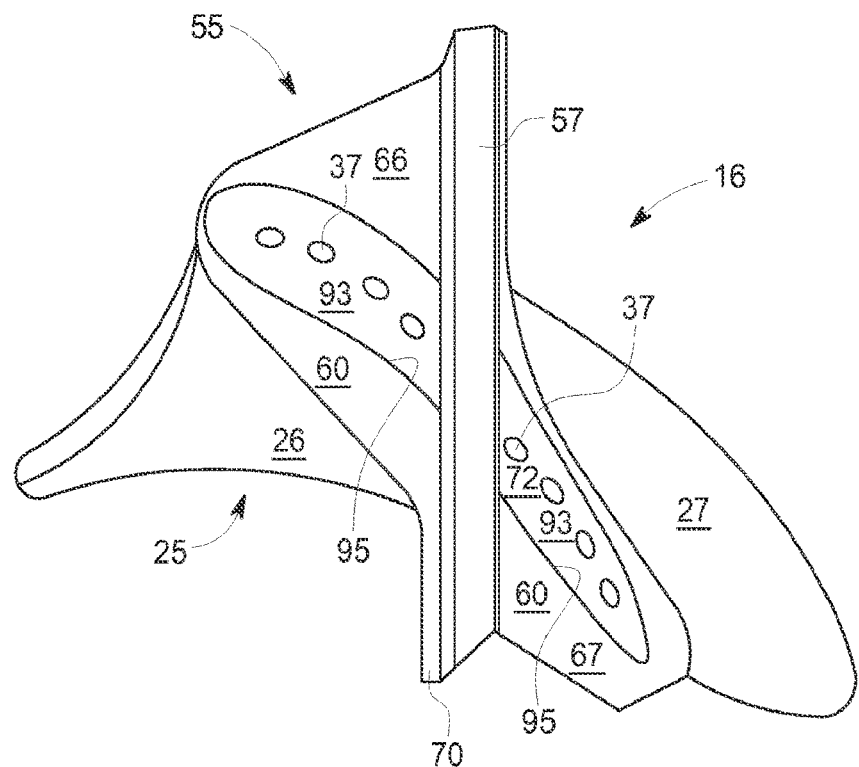
FIG. 22 is a top view of a tip shrouded turbine rotor blade that includes a tip shroud configured according to an alternative embodiment of the present invention.
Figure 23:
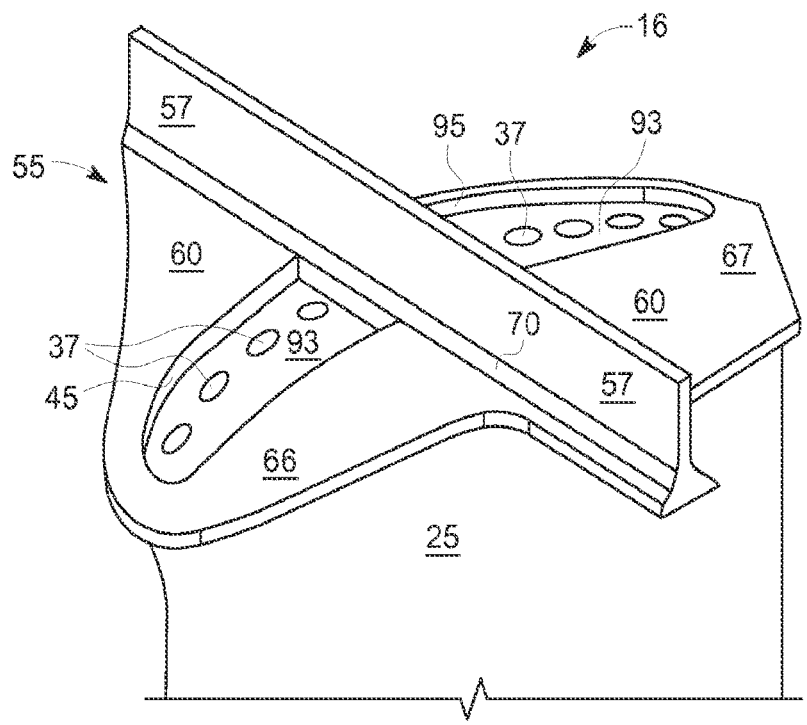
FIG. 23 is a perspective view of the tip shrouded turbine rotor blade of FIG. 22.
Figure 24:
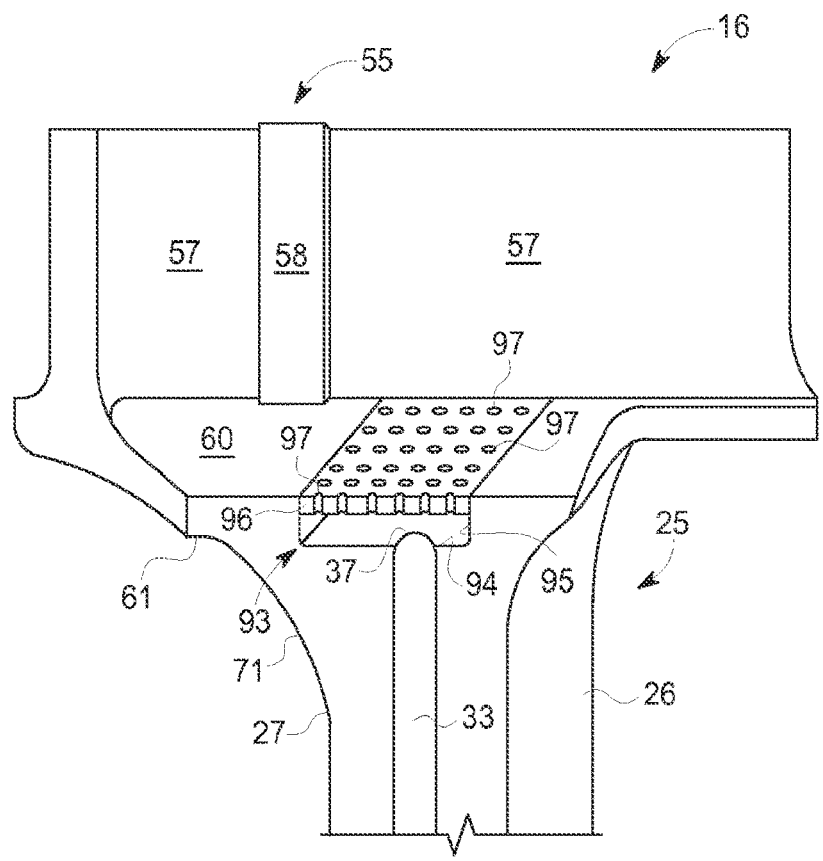
FIG. 24 is a perspective view of the tip shrouded turbine rotor blade that includes a tip shroud configured according to an alternative embodiment of the present invention.

As illustrated in FIGS. 22 through 24, an alternative configuration for the flow directing structure on the outboard surface 60 of the tip shroud 55 is provided. As will be appreciated, certain functionality and performance benefits associated with the already described shroud fence 91 is achieved via a recessed pocket (referred to herein as a "shroud recess 93"). The shroud recess 93 may be formed into the outboard surface 60 of the tip shroud 55, and may include steep sidewalls 95 that connect a recess floor 94 to the outboard surface 60 of the tip shroud 55. According to certain preferred embodiments and as illustrated, the footprint of the shroud recess 93 may coincide with the airfoil profile. The radially extending cooling channels 33 may include outlet ports 37 that are formed through the recess floor 94. Multiple outlet ports 37 may be included in the recess floor 94.

According the an alternative configuration, as illustrated in FIG. 24, a recess coverplate 96 may cap the shroud recess 93. The recess coverplate 96 may include multiple perforations 97 for expelling the coolant delivered to the shroud recess 93 by the cooling channels 33. As will be appreciated the recess coverplate 96 may function as a filter cap that weakens the flow of coolant being discharged from the cooling channels, which may further reduce the negative impact of mixing losses by slowing and spreading the discharged coolant over a larger area. As illustrated in relation to previously discussed embodiments, the perforations 97 may be angled or canted so to further reduce mixing losses. For example, according to preferred embodiments, the perforations 97 may be canted in the rotation direction of the rotor blade 16. According to another embodiment, the perforations 97 may be canted in the downstream direction, which, in the case of perforations 97 positioned on the leading portion 66 of the tip shroud 55, may be toward the seal rail 57 and, more particularly, the outboard fillet region 70 that connects the seal rail 57 and the outboard surface 60 of the tip shroud 55. As will be appreciated, such configurations may further reduce mixing of the discharged coolant with the secondary flows of the outboard tip of the airfoil.

In operation, as will be appreciated, the shroud fence 91 and/or the shroud recess 93 may function to reduce mixing losses of coolant discharged from the outboard surface 60 of the tip shroud 55. Additionally, the present invention may be used to direct the flow of discharged coolant to enhance cooling effects for certain exterior regions and/or reduce undesirable migration toward other regions. In this way, cooling deficiencies may be addressed and/or discharged coolant may be directed toward a flowpath reentry that minimizes mixing losses.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A rotor blade for a turbine of a gas turbine that includes an airfoil, the airfoil having a leading edge, a trailing edge, an outboard tip, and an inboard end that attaches to a root configured to couple the rotor blade to a rotor disc, wherein the airfoil comprises a cooling configuration that includes elongated cooling channels for receiving and directing a coolant through the airfoil, the rotor blade further comprising:

a tip shroud connected to the outboard tip of the airfoil, wherein the tip shroud comprises a seal rail that projects radially outward from the outboard surface of the tip shroud and extends circumferentially in the rotation direction, the seal rail being supported by the airfoil at the outboard tip of the airfoil; and branching passages formed through the tip shroud, each of the branching passages comprising an outlet section residing near the outboard surface of the tip shroud and extending between a connection with one of the cooling channels and an outlet port formed on a surface of the tip shroud; wherein a cross-sectional flow area of each of the branching passages is less than a cross-sectional flow area of the cooling channel to which the branching passage attaches; wherein each of the branching passages comprises a canted orientation relative the outboard surface of the tip shroud for discharging coolant obliquely relative an area of the outboard surface of the tip shroud that is adjacent to the outlet port; wherein each of the branching passages defines a discharge direction that is a direction that coolant discharged from the branching passage is aimed, the discharge direction being defined via a continuation from the outlet port of a central axis of a respective outlet section;

wherein a first discharge angle is defined between the discharge direction and the outboard surface of the tip shroud, the first discharge angle of each of the branching passages being in the range of between about 10° and 60°;

wherein a rotation direction comprises a direction of rotation for the rotor blade during expected operation in the turbine;

wherein a second discharge angle is defined between the discharge direction and a reference line parallel to the rotation direction;

wherein the outboard surface of the tip shroud comprises a leading portion that extends forward from the seal rail so to overhang the leading edge of the airfoil, and a trailing portion that extends aftward from the seal rail so to overhang the trailing edge of the airfoil;

wherein the outlet ports of multiple ones of the branching passages comprise a position on the leading portion of the outboard surface; and wherein the second discharge angle of the multiple ones of the branching passages having the outlet ports on the leading portion of the outboard surface comprises an angle less than about 45° relative to the reference line pointing with the rotation direction.

2. The turbine rotor blade according to claim 1, wherein the first discharge angle of each of the branching passages comprises a range of between about 20° and 45°.

3. The turbine rotor blade according to claim 1, wherein the first discharge angle of each of the branching passages comprises an angle less than about 45°.

4. The turbine rotor blade according to claim 1, wherein at least one of the branching passages forms the second discharge angle with the reference line pointing with the rotation direction, and at least one of the branching passages forms the second discharge angle with the reference line pointing against the rotation direction.

5. The turbine rotor blade according to claim 1, wherein the second discharge angle of the multiple ones of the branching passages having the outlet ports on the leading portion of the outboard surface comprises an angle less than about 20° relative to the reference line pointing with the rotation direction.

6. The turbine rotor blade according to claim 5, wherein the second discharge angle is canted to a downstream side of the reference line pointing with the rotation direction.

7. The turbine rotor blade according to claim 1, wherein the second discharge angle of the multiple ones of the branching passages having the outlet ports on the leading portion of the outboard surface comprises an angle less than about 5° relative to the reference line pointing with the rotation direction.

8. The turbine rotor blade according to claim 5, wherein the outlet ports of multiple ones of the branching passages comprise a position on the trailing portion of the outboard surface; and wherein the second discharge angle of the multiple ones of the branching passages having the outlet ports on the trailing portion of the outboard surface comprises an angle less than about 20° relative to the reference line pointing against the rotation direction.

9. The turbine rotor blade according to claim 1, wherein the outboard surface of the tip shroud comprises a pressure side portion that cantilevers from the pressure side face of the airfoil and a suction side portion that cantilevers from the suction side face of the airfoil; and wherein an airfoil profile comprises an outline of a profile of the airfoil on the outboard surface of the tip shroud, and wherein the outboard surface of the tip shroud comprises an airfoil portion that is defined within the airfoil profile.

10. The turbine rotor blade according to claim 9, wherein the leading portion of the outboard surface comprises multiple ones of the outlet ports formed thereon; and wherein each of the multiple ones of the outlet ports on the leading portion is oriented in a direction approximately toward the rotation direction.

11. The turbine rotor blade according to claim 10, wherein the rotor blade comprises an inboard fillet region configured to smoothly transition between a surface of the airfoil and an inboard surface of the tip shroud; and wherein multiple ones of the branching passages are configured so to intersect an inboard fillet region.

12. The turbine rotor blade according to claim 11, wherein at least one of the branching passages that intersect the inboard fillet region comprises an outlet port formed through a peripheral edge of the tip shroud.

13. The turbine rotor blade according to claim 10, wherein the trailing portion of the outboard surface comprises multiple ones of the outlet ports formed thereon; and wherein each of the multiple ones of the outlet ports on the trailing portion is oriented in a direction approximately against the rotation direction.

14. The turbine rotor blade according to claim 13, wherein the branching passages having outlet ports on the leading portion of the outboard surface extend from the connection made with one of the cooling channels in a direction approximately toward the rotation direction such that the outlet ports thereof are located within a region of the outboard surface of the tip shroud defined as an intersection of the leading portion and the suction side portion; and wherein the branching passages having outlet ports on the trailing portion of the outboard surface extend from the connection made with one of the cooling channels in a direction approximately against the rotation direction such that the outlet ports are located within a region of the outboard surface of the tip shroud defined as an intersection of the leading portion and the suction side portion.

15. The turbine rotor blade according to claim 10, wherein at least one of the cooling channels having an outlet port on the leading portion comprises a plug disposed at the outboard surface of the tip shroud.

16. The turbine rotor blade according to claim 15, wherein the plug comprises a non-integral plug;

wherein the plug comprises a configuration such that, upon installation, a surface of the plug resides flush relative to the outboard surface of the tip shroud; and wherein the plug comprises a partial plug having a radially oriented plug port defined therethrough, the plug port having a cross-sectional flow area less than the cross-sectional flow area of the cooling channel.

17. The turbine rotor blade according to claim 15, wherein the plug comprises a non-integral plug;

wherein the plug comprises a configuration such that, upon installation, a surface of the plug resides flush relative to the outboard surface of the tip shroud;

wherein the plug comprises a complete plug, the complete plug configured so to substantially block all discharge of coolant from an outlet port of the cooling channel; and wherein multiple ones of the branching passages connect to the cooling channel that includes the complete plug.

18. The turbine rotor blade according to claim 1, further comprising a supply plenum disposed near the outboard surface of the tip shroud into which the elongated cooling channels feed;

wherein multiple ones of the branching passages connect to the supply plenum, each of the multiple ones of the branching passages having a respective outlet port; and wherein each of the respective outlet ports is oriented in a direction approximately toward the rotation direction.

19. The turbine rotor blade according to claim 18, wherein the supply plenum comprises a non-integral plenum cover, the plenum cover comprising a configuration such that, upon installation, a surface of the plenum cover resides flush relative to the outboard surface of the tip shroud;

wherein the plenum cover comprises at least one radially oriented cover port for discharging a portion of the coolant from the supply plenum; and wherein the respective cross-sectional flow areas of the at least one radially oriented cover port through the plenum cover and the branching passages that connect to the supply plenum are sized according to a desired coolant distribution through the tip shroud.

* * * * *